US011537527B2

(12) United States Patent
Ambula et al.

(10) Patent No.: US 11,537,527 B2
(45) Date of Patent: Dec. 27, 2022

(54) DYNAMIC LOGICAL PAGE SIZES FOR MEMORY DEVICES

(71) Applicant: Micron Technology, Inc., Boise, ID (US)

(72) Inventors: Sharath Chandra Ambula, Mancherial (IN); David Aaron Palmer, Boise, ID (US); Venkata Kiran Kumar Matturi, Khammam (IN); Sri Ramya Pinisetty, Hyderabad (IN); Sushil Kumar, Nallagandla (IN)

(73) Assignee: Micron Technology, Inc., Boise, ID (US)

( * ) Notice: Subject to any disclaimer, the term of this patent is extended or adjusted under 35 U.S.C. 154(b) by 47 days.

(21) Appl. No.: 17/117,907

(22) Filed: Dec. 10, 2020

(65) Prior Publication Data

US 2022/0188244 A1 Jun. 16, 2022

(51) Int. Cl.
*G06F 12/1009* (2016.01)

(52) U.S. Cl.
CPC .... *G06F 12/1009* (2013.01); *G06F 2212/657* (2013.01)

(58) Field of Classification Search
CPC ........... G06F 12/1009; G06F 2212/652; G06F 2212/657
See application file for complete search history.

(56) References Cited

U.S. PATENT DOCUMENTS

| | | | | |
|---|---|---|---|---|
| 5,617,554 A * | 4/1997 | Alpert | G06F 12/1009 711/212 |
| 2014/0156968 A1* | 6/2014 | Terry | G06F 12/1009 711/207 |
| 2018/0349286 A1* | 12/2018 | Rana | G06F 12/1009 |

* cited by examiner

*Primary Examiner* — Gary W. Cygiel
(74) *Attorney, Agent, or Firm* — Holland & Hart LLP

(57) ABSTRACT

Methods, systems, and devices for dynamic logical page sizes for memory devices are described. A memory device may use an initial set of logical pages each having a same size and one or more logical-to-physical (L2P) tables to map logical addresses of the logical pages to the physical addresses of corresponding physical pages. As commands are received from a host device, the memory device may dynamically split a logical page to introduce smaller logic pages if the host device accesses data in chunk sizes smaller than the size of the logical page that is split. The memory device may maintain one or more additional L2P tables for each smaller logical page size that is introduced, along with one or more pointer tables to map between L2P tables and entries for larger logical page sizes and L2P tables and entries associated with smaller logical page sizes.

25 Claims, 8 Drawing Sheets

Receive a write command for writing a first amount of data to a memory device, the write command associated with an LBA — 705

Read, based on the LBA, a first entry of a first L2P table, where the first L2P table is for mapping a set of LBAs to physical addresses of a corresponding first set of logical pages of the memory device that each have a first logical page size, and where the first entry of the first L2P table includes a first physical address of a first logical page of the first set of logical pages — 710

Identify, based on a size of the first amount of data, a second logical page size — 715

Write, based on the first physical address, at least a portion of the first amount of data to a second logical page of the memory device having the second logical page size, the first logical page including the second logical page — 720

Store, based on identifying the second logical page size, a first entry of a second L2P table for mapping a second set of LBAs to physical addresses of a corresponding second set of logical pages of the memory device, each logical page of the second set of logical pages having the second logical page size, where the first entry in the second L2P table includes a second physical address of the second logical page — 725

700

DYNAMIC LOGICAL PAGE SIZES FOR MEMORY DEVICES

FIELD OF TECHNOLOGY

The following relates generally to one or more systems for memory and more specifically to dynamic logical page sizes for memory devices.

BACKGROUND

Memory devices are widely used to store information in various electronic devices such as computers, wireless communication devices, cameras, digital displays, and the like. Information is stored by programing memory cells within a memory device to various states. For example, binary memory cells may be programmed to one of two supported states, often corresponding to a logic 1 or a logic 0. In some examples, a single memory cell may support more than two possible states, any one of which may be stored by the memory cell. To access information stored by a memory device, a component may read, or sense, the state of one or more memory cells within the memory device. To store information, a component may write, or program, one or more memory cells within the memory device to corresponding states.

Various types of memory devices exist, including magnetic hard disks, random access memory (RAM), read-only memory (ROM), dynamic RAM (DRAM), synchronous dynamic RAM (SDRAM), ferroelectric RAM (FeRAM), magnetic RAM (MRAM), resistive RAM (RRAM), flash memory, phase change memory (PCM), 3-dimensional cross-point memory (3D cross point), not-or (NOR), and not-and (NAND) memory devices, and others. Memory devices may be volatile or non-volatile. Volatile memory cells (e.g., DRAM cells) may lose their programmed states over time unless they are periodically refreshed by an external power source. Non-volatile memory cells (e.g., NAND memory cells) may maintain their programmed states for extended periods of time even in the absence of an external power source.

DETAILED DESCRIPTION

Figure 1:
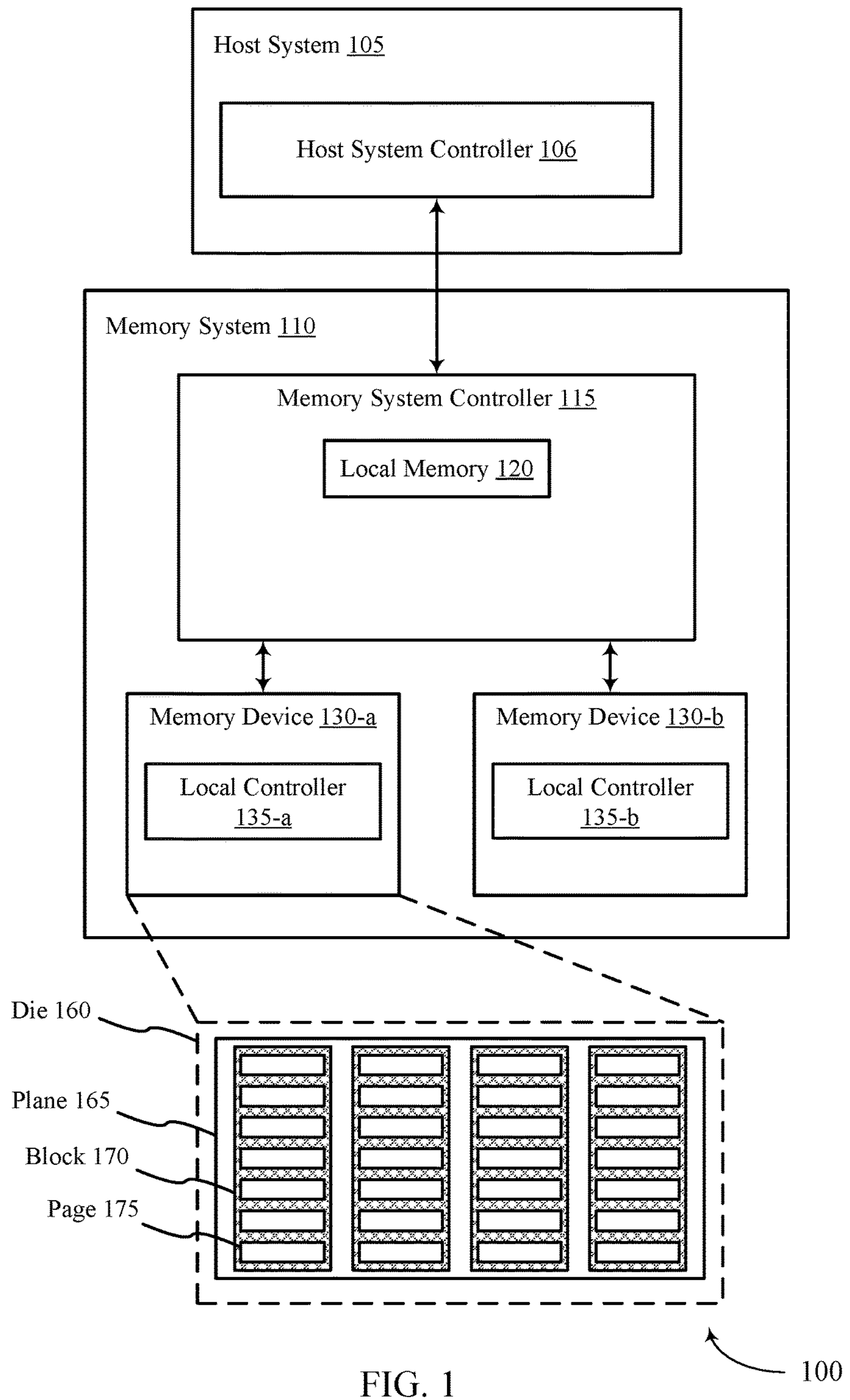
FIG. 1 illustrates an example of a system that supports dynamic logical page sizes for memory devices in accordance with examples as disclosed herein.

Memory cells within a memory device may each be associated with a corresponding physical address, where a physical address may identify the physical location of a corresponding memory cell within the memory device. The physical location of data within a memory device may change over time, due to the memory device accommodating the writing of additional data, maintenance operations performed by the memory device, or for any number of other reasons. A host device for the memory device may reference data (e.g., when issuing read, write, or other commands associated with the data) using logical addresses (which may alternatively be referred to as virtual addresses or system addresses, among other possibilities), and the memory device may maintain a mapping between the logical addresses associated with data stored by the memory device and the physical addresses of the memory cells at which the data is stored, which may support the memory device changing the physical addresses over time as described herein.

For example, the host device may refer to the location of data stored in the memory device using a logical block address (LBA), which may be mapped to a physical address of a page of memory of the memory device at which the data is stored, where a page may refer to a grouping of memory cells as explained further herein. Though examples may be described herein with reference to LBAs, it is to be understood that the teachings herein may be extended to other types of logical addresses. Because the physical address of the data may change, some memory devices may maintain one or more logical-to-physical (L2P) tables that map LBAs referenced by the host device to corresponding physical addresses of pages in the memory device. In this manner, the host device can request to read data from the memory device using the same LBA as was used for writing the data even if the data was moved to a different physical address during the interim.

Some memory devices partition physical pages into logical pages that have a different page size than the physical page size. For example, a memory device may have a physical page size of 16 KB, and these physical pages may be partitioned into logical pages that each have a logical page size of 4 KB. In this case, the L2P tables may be used to map LBAs provided by the host to physical addresses of logical pages, thereby enabling the host device to read and write data to a smaller page size than the physical page size. Such L2P tables may require more entries than L2P tables that map LBAs to physical addresses, however, because there are more logical pages than physical pages.

The length of an L2P table (in terms of the quantity of entries) may affect the performance of the memory device. For example, the memory device may incur more overhead for generating, storing, maintaining, and traversing longer L2P tables than for shorter L2P tables. Thus, reducing the quantity of entries in an L2P table may lead to performance improvements. Further, consulting L2P tables may incur latency in responding to a command (e.g., read or write command) issued by the host device. For example, L2P tables may be stored within the memory device and read by a controller for (e.g., coupled with) the memory device, and in some cases L2P tables may be organized as a hierarchy of L2P tables. Thus, aspects of the teaching herein, including reducing a number of tables that may be traversed or read from the memory device in order to identify the physical address corresponding to the data associated with an LBA, may further provide latency benefits, among other benefits that may be appreciated by one of ordinary skill in the art.

As described herein, a memory device may reduce the quantity of entries in L2P tables by using multiple and dynamic logical page sizes, where the size of logical pages used by the memory device may be dynamic and may range from a maximum logical page size (which may be the same as or larger than the physical page size of the memory device) to a minimum logical page size (which may be smaller than a physical page size of the memory device)—e.g., as opposed to using only a single logical page size, using only logical pages each having a fixed size, or both. The memory device may select the logical page size for storing the data associated with a write command based on the size (e.g., quantity, length) of the data to be written, and may maintain multiple L2P tables that are each associated with a particular logical page size among the multiple logical page sizes that may be used by the memory device.

For example, the memory device may initially generate or otherwise store L2P tables with entries that each point to logical pages having the maximum page size, thereby reducing the quantity of entries in these L2P tables. If the host requests to write an amount of data that would consume the maximum page size, the memory device may use these L2P tables to locate a logical page of the maximum page size for writing the data. If, however, the host requests to write data that can be accommodated by a smaller logical page size, the memory device may split the larger logical pages into a group of two or more smaller logical pages and store the data in a smaller logical page within the prior, larger logical page.

To enable subsequent retrieval of the data from the smaller logical page, the memory device may update the original L2P entry pointing to the larger logical page to indicate that the page has been split. The memory device may create a new L2P table that includes entries pointing to the smaller logical pages, and may add or update an entry in an L2P pointer table that points to the new L2P table and indicates the length of the new L2P table.

When the host device subsequently requests to read the data, the memory device may traverse the two levels of L2P tables to find the data based on the LBA. For example, the memory device may read the entry in the original L2P table corresponding to the requested LBA, determine that the larger logical page has been split, read an entry in the L2P pointer table to identify the location and length of the new L2P table, and read an entry in the new L2P table to find the location of the data.

As described herein, this approach enables the memory device to use fewer or shorter L2P tables when the host requests to read or write large data streams (such as for streaming audio or video) while allowing the memory device to split the larger logical pages into smaller logical pages when the host device requests to write smaller amounts of data. Thus, the size and assortment of logical page sizes and the size and quantity of L2P tables used by the memory device may dynamically change in response to commands issued by the host device, with the memory device initially using few and short L2P tables along with large logical pages and, during operation, increasing the count and length of L2P tables and introducing smaller logical page sizes on a dynamic (e.g., "as-needed") basis. These and other techniques described herein may allow the memory device to use a quantity and length of L2P table and logical addresses that is "right-sized" for the data access patterns of the host device, thereby providing latency, overhead, and other benefits as described herein or as may otherwise be appreciated by one of ordinary skill in the art.

Features of the disclosure are initially described in the context of a system as described with reference to FIG. 1. Features of the disclosure are described in the context operational flows and process flows as described with reference to FIGS. 2-5. These and other features of the disclosure are further illustrated by and described with reference to an apparatus diagram and flowcharts that relate to dynamic logical page sizes for memory devices as described with reference to FIGS. 6-8.

FIG. 1 is an example of a system 100 that supports dynamic logical page sizes for memory devices in accordance with examples as disclosed herein. The system 100 includes a host system 105 coupled with a memory system 110.

A memory system 110 may be or include any device or collection of devices, where the device or collection of devices includes at least one memory array. For example, a memory system 110 may be or include a Universal Flash Storage (UFS) device, an embedded Multi-Media Controller (eMMC) device, a flash device, a universal serial bus (USB) flash device, a secure digital (SD) card, a solid-state drive (SSD), a hard disk drive (HDD), a dual in-line memory module (DIMM), a small outline DIMM (SO-DIMM), or a non-volatile DIMM (NVDIMM), among other possibilities.

The system 100 may be included in a computing device such as a desktop computer, a laptop computer, a network server, a mobile device, a vehicle (e.g., airplane, drone, train, automobile, or other conveyance), an Internet of Things (IoT) enabled device, an embedded computer (e.g., one included in a vehicle, industrial equipment, or a networked commercial device), or any other computing device that includes memory and a processing device.

The system 100 may include a host system 105, which may be coupled with the memory system 110. In some examples, this coupling may include an interface with a host system controller 106, which may be an example of a control component configured to cause the host system 105 to perform various operations in accordance with examples as described herein. The host system 105 may include one or more devices, and in some cases may include a processor chipset and a software stack executed by the processor chipset. For example, the host system 105 may include an application configured for communicating with the memory system 110 or a device therein. The processor chipset may include one or more cores, one or more caches (e.g., memory local to or included in the host system 105), a memory controller (e.g., NVDIMM controller), and a storage protocol controller (e.g., PCIe controller, SATA controller). The host system 105 may use the memory system 110, for example, to write data to the memory system 110 and read data from the memory system 110. Although one memory system 110 is shown in FIG. 1, it is to be understood that the host system 105 may be coupled with any quantity of memory systems 110.

The host system 105 may be coupled with the memory system 110 via at least one physical host interface. The host system 105 and the memory system 110 may in some cases be configured to communicate via a physical host interface using an associated protocol (e.g., to exchange or otherwise communicate control, address, data, and other signals between the memory system 110 and the host system 105). Examples of a physical host interface may include, but are not limited to, a serial advanced technology attachment (SATA) interface, a UFS interface, an eMMC interface, a peripheral component interconnect express (PCIe) interface, a USB interface, a Fiber Channel interface, a Small Computer System Interface (SCSI), a Serial Attached SCSI (SAS), a Double Data Rate (DDR) interface, a dual in-line memory module (DIMM) interface (e.g., DIMM socket interface that supports DDR), an Open NAND Flash Interface (ONFI), and a Low Power Double Data Rate (LPDDR) interface. In some examples, one or more such interfaces may be included in or otherwise supported between a host system controller 106 of the host system 105 and a memory system controller 115 of the memory system 110. In some examples, the host system 105 may be coupled with the memory system 110 (e.g., the host system controller 106 may be coupled with the memory system controller 115) via a respective physical host interface for each memory device 130 included in the memory system 110, or via a respective physical host interface for each type of memory device 130 included in the memory system 110.

Memory system 110 may include a memory system controller 115 and one or more memory devices 130. A memory device 130 may include one or more memory arrays of a any type of memory cells (e.g., non-volatile memory cells, volatile memory cells, or any combination thereof). Although two memory devices 130-*a* and 130-*b* are shown in the example of FIG. 1, it is to be understood that memory system 110 may include any quantity of memory devices 130. Further, where memory system 110 includes more than one memory device 130, different memory devices 130 within memory system 110 may include the same or different types of memory cells.

The memory system controller 115 may be coupled with and communicate with the host system 105 (e.g., via the physical host interface), and may be an example of a control component configured to cause the memory system 110 to perform various operations in accordance with examples as described herein. The memory system controller 115 may also be coupled with and communicate with memory devices 130 to perform operations such as reading data, writing data, erasing data, or refreshing data at a memory device 130, and other such operations, which may generically be referred to as access operations. In some cases, the memory system controller 115 may receive commands from the host system 105 and communicate with one or more memory devices 130 to execute such commands (e.g., at memory arrays within the one or more memory devices 130). For example, the memory system controller 115 may receive commands or operations from the host system 105 and may convert the commands or operations into instructions or appropriate commands to achieve the desired access of the memory devices 130. And in some cases, the memory system controller 115 may exchange data with the host system 105 and with one or more memory devices 130 (e.g., in response to or otherwise in association with commands from the host system 105). For example, the memory system controller 115 may convert responses (e.g., data packets or other signals) associated with the memory devices 130 into corresponding signals for the host system 105.

The memory system controller 115 may be configured for other operations associated with the memory devices 130. For example, the memory system controller 115 may execute or manage operations such as wear-leveling operations, garbage collection operations, error control operations such as error-detecting operations or error-correcting operations, encryption operations, caching operations, media management operations, background refresh, health monitoring, and address translations between logical addresses (e.g., logical block addresses (LBAs)) associated with commands from the host system 105 and physical addresses (e.g., physical block addresses) associated with memory cells within the memory devices 130.

The memory system controller 115 may include hardware such as one or more integrated circuits or discrete components, a buffer memory, or a combination thereof. The hardware may include circuitry with dedicated (e.g., hard-coded) logic to perform the operations ascribed herein to the memory system controller 115. The memory system controller 115 may be or include a microcontroller, special purpose logic circuitry (e.g., a field programmable gate array (FPGA), an application specific integrated circuit (ASIC), a digital signal processor (DSP)), or any other suitable processor or processing circuitry.

The memory system controller 115 may also include a local memory 120. In some cases, the local memory 120 may include read-only memory (ROM) or other memory that may store operating code (e.g., executable instructions) executable by the memory system controller 115 to perform functions ascribed herein to the memory system controller 115. In some cases, the local memory 120 may additionally or alternatively include static random access memory (SRAM) or other memory that may be used by the memory system controller 115 for internal storage or calculations, for example, related to the functions ascribed herein to the memory system controller 115. Additionally or alternatively, the local memory 120 may serve as a cache for the memory system controller 115. For example, data may be stored in the local memory 120 when read from or written to a memory device 130, and may be available within the local memory 120 for subsequent retrieval for or manipulation (e.g., updating) by the host system 105 (e.g., with reduced latency relative to a memory device 130) in accordance with a cache policy.

Although the example of memory system 110 in FIG. 1 has been illustrated as including the memory system controller 115, in some cases, a memory system 110 may not include a memory system controller 115. For example, the memory system 110 may additionally or alternatively rely upon an external controller (e.g., implemented by the host system 105) or one or more local controllers 135, which may be internal to memory devices 130, respectively, to perform the functions ascribed herein to the memory system controller 115. In general, one or more functions ascribed herein to the memory system controller 115 may in some cases instead be performed by the host system 105, a local controller 135, or any combination thereof. In some cases, a memory device 130 that is managed at least in part by a memory system controller 115 may be referred to as a managed memory device. An example of a managed memory device is a managed NAND (MNAND) device.

A memory device 130 may include one or more arrays of non-volatile memory cells. For example, a memory device 130 may include NAND (e.g., NAND flash) memory, ROM, phase change memory (PCM), self-selecting memory, other chalcogenide-based memories, ferroelectric RAM (FeRAM), magneto RAM (MRAM), NOR (e.g., NOR flash) memory, Spin Transfer Torque (STT)-MRAM, conductive bridging RAM (CBRAM), resistive random access memory (RRAM), oxide based RRAM (OxRAM), and electrically erasable programmable ROM (EEPROM). Additionally or alternatively, a memory device 130 may include one or more arrays of volatile memory cells. For example, a memory device 130 may include random access memory (RAM) memory cells, such as dynamic RAM (DRAM) memory cells and synchronous DRAM (SDRAM) memory cells.

In some examples, a memory device 130 may include (e.g., on a same die or within a same package) a local controller 135, respectively, which may execute operations on one or more memory cells of the memory device 130. A local controller 135 may operate in conjunction with a memory system controller 115 or may perform one or more functions ascribed herein to the memory system controller 115.

In some cases, a memory device 130 may be or include a NAND device (e.g., NAND flash device). A memory device 130 may be or include a memory die 160. For example, in some cases, a memory device 130 may be a package that includes one or more dies 160. A die 160 may, in some examples, be a piece of electronics-grade semiconductor cut from a wafer (e.g., a silicon die cut from a silicon wafer). Each die 160 may include one or more planes 165, and each plane 165 may include a respective set of blocks 170, where each block 170 may include a respective set of pages 175, and each page 175 may include a set of memory cells.

In some cases, a NAND memory device 130 may include memory cells configured to each store one bit of information, which may be referred to as single level cells (SLCs). Additionally or alternatively, a NAND memory device 130 may include memory cells configured to each store multiple bits of information, which may be referred to as multi-level cells (MLCs) if configured to each store two bits of information, as tri-level cells (TLCs) if configured to each store three bits of information, as quad-level cells (QLCs) if configured to each store four bits of information, or more generically as multiple-level memory cells. Multiple-level memory cells may provide greater density of storage relative to SLC memory cells but may, in some cases, involve narrower read or write margins or greater complexities for supporting circuitry.

In some cases, planes 165 may refer to groups of blocks 170, and in some cases, concurrent operations may take place within different planes 165. For example, concurrent operations may be performed on memory cells within different blocks 170 so long as the different blocks 170 are in different planes 165. In some cases, performing concurrent operations in different planes 165 may be subject to one or more restrictions, such as identical operations being performed on memory cells within different pages 175 that have the same page address within their respective planes 165 (e.g., related to command decoding, page address decoding circuitry, or other circuitry being shared across planes 165).

In some cases, a block 170 may include memory cells organized into rows (pages 175) and columns (e.g., strings, not shown). For example, memory cells in a same page 175 may share (e.g., be coupled with) a common word line, and memory cells in a same string may share (e.g., be coupled with) a common digit line (which may alternatively be referred to as a bit line).

For some NAND architectures, memory cells may be read and programmed (e.g., written) at a first level of granularity (e.g., at the page level of granularity) but may be erased at a second level of granularity (e.g., at the block level of granularity). That is, a page 175 may be the smallest unit of memory (e.g., set of memory cells) that may be independently programmed or read (e.g., programed or read concurrently as part of a single program or read operation), and a block 170 may be the smallest unit of memory (e.g., set of memory cells) that may be independently erased (e.g., erased concurrently as part of a single erase operation). Further, in some cases, NAND memory cells may be erased before they can be re-written with new data. Thus, for example, a used page 175 may in some cases not be updated until the entire block 170 that includes the page 175 has been erased.

In some cases, to update some data within a block 170 while retaining other data within the block 170, the memory device 130 may copy the data to be retained to a new block 170 and write the updated data to one or more remaining pages of the new block 170. The memory device 130 (e.g., the local controller 135) or the memory system controller 115 may mark or otherwise designate the data that remains in the old block 170 as invalid or obsolete, and update an L2P mapping table to associate the logical address (e.g., LBA) for the data with the new, valid block 170 rather than the old, invalid block 170. In some cases, such copying and remapping may be preferable to erasing and rewriting the entire old block 170, due to latency or wearout considerations, for example. In some cases, one or more copies of an L2P mapping table may be stored within the memory cells of the memory device 130 (e.g., within or more blocks 170 or planes 165) for use (e.g., reference and updating) by the local controller 135 or memory system controller 115.

In some cases, L2P tables may be maintained and data may be marked as valid or invalid at the page level of granularity, and a page 175 may contain valid data, invalid data, or no data. Invalid data may be data that is outdated due to a more recent or updated version of the data being stored in a different page 175 of the memory device 130. Invalid data have been previously programmed to the invalid page 175 but may no longer be associated with a valid logical address, such as a logical address referenced by the host system 105. Valid data may be the most recent version of such data being stored on the memory device 130. A page 175 that includes no data may be a page 175 that has never been written to or that has been erased.

In some cases, a memory system controller 115 or a local controller 135 may perform operations (e.g., as part of one or more media management algorithms) for a memory device 130, such as wear leveling, background refresh, garbage collection, scrub, block scans, health monitoring, or others, or any combination thereof. For example, within a memory device 130, a block 170 may have some pages 175 containing valid data and some pages 175 containing invalid data. To avoid waiting for all of the pages 175 in the block 170 to have invalid data in order to erase and reuse the block 170, an algorithm referred to as "garbage collection" may be invoked to allow the block 170 to be erased and released as a free block for subsequent write operations. Garbage collection may refer to a set of media management operations that include, for example, selecting a block 170 that contains valid and invalid data, selecting pages 175 in the block that contain valid data, copying the valid data from the selected pages 175 to new locations (e.g., free pages 175 in another block 170), marking the data in the previously selected pages 175 as invalid, and erasing the selected block 170. As a result, the number of blocks 170 that have been erased may be increased such that more blocks 170 are available to store subsequent data (e.g., data subsequently received from the host system 105).

The quantity and lengths of L2P tables (e.g., in terms of the quantity of entries) may affect the performance of the memory device. For example, the memory device may incur more overhead for generating, maintaining, and traversing longer L2P tables than for shorter L2P tables. Thus, reducing the quantity, lengths, or both of L2P tables may lead to performance improvements.

The memory system 110 may reduce the quantity, lengths, or both of L2P tables by using multiple, dynamic logical page sizes as described herein. For example, a memory device 130 may initially generate L2P tables with entries that point to logical pages having a maximum page size, thereby reducing the quantity of entries in the L2P tables of each respective memory device. The memory system controller 115 may initially generate a main L2P table with entries that map LBAs to the initially generated L2P tables of the memory device 130. If the host system 105 requests to write an amount of data, for example to the memory device 130, that would consume the maximum page size, the memory system controller 115 may use the main L2P table and the L2P tables of the memory device 130 to locate a logical page of the maximum page size for writing the data. If the host system 105 requests to write an amount of data that can be accommodated by a smaller logical page size, however, the memory device 130 may split the larger logical pages into a group of two or more smaller logical pages and store the data in a smaller logical page within the larger logical page.

To enable subsequent retrieval of the data from the smaller logical page, the memory device 130 may update the original L2P entry pointing to the larger logical page to indicate that the page has been split. The memory device 130 may create a new L2P table that includes entries pointing to the smaller logical pages, and the memory system controller 115 may add or update an entry in an L2P pointer table stored in local memory 120 that points to the new L2P table and indicates the length of the new L2P table.

When the host system 105 subsequently requests to read the data, the memory system controller 115 may traverse the two levels of L2P tables to find the data based on the LBA. For example, the memory system controller 115 may read the entry in the original L2P table of the memory device 130 corresponding to the requested LBA, determine that the larger logical page has been split, read an entry in the L2P pointer table of the local memory 120 to identify the location and length of the new L2P table, and read an entry in the new L2P table of the memory device 130 to find the location of the data.

As described herein, this approach enables the memory system 110 to use shorter L2P tables when the host system 105 requests to read or write large data streams (such as for streaming audio or video) while allowing the memory device 130 to split the larger logical pages into smaller logical pages when the host system 105 requests to write smaller amounts of data.

The system 100 may include any quantity of non-transitory computer readable media that support dynamic logical page sizes for memory devices. For example, the host system 105, the memory system controller 115, or a memory device 130 may include or otherwise may access one or more non-transitory computer readable media storing instructions (e.g., firmware) for performing the functions ascribed herein to the host system 105, memory system controller 115, or memory device 130. For example, such instructions, when executed by the host system 105 (e.g., by the host system controller 106), by the memory system controller 115, or by a memory device 130 (e.g., by a local controller 135), may cause the host system 105, memory system controller 115, or memory device 130 to perform one or more associated functions as described herein.

Figure 2:
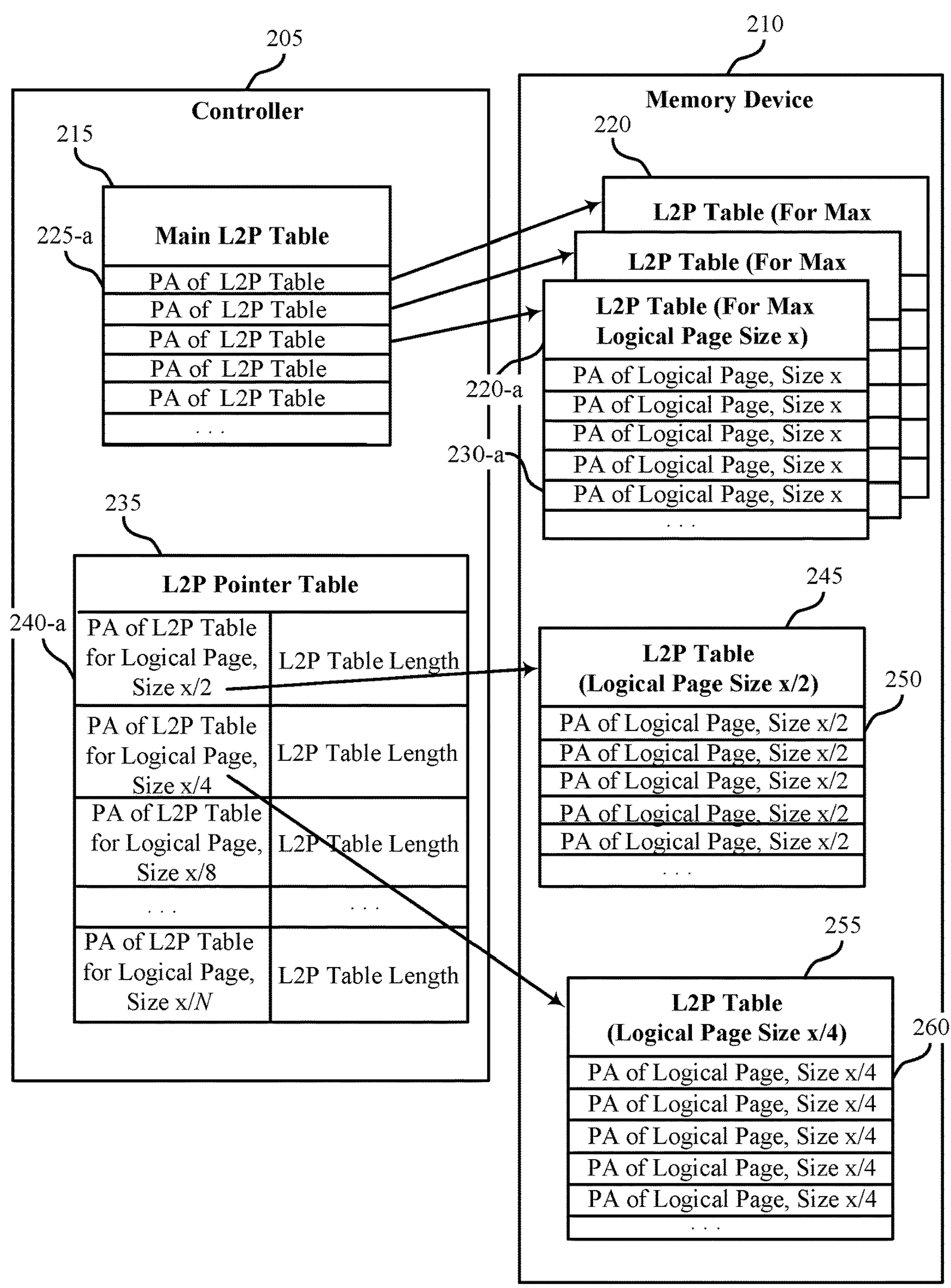
FIG. 2 illustrates an example of an L2P table architecture that supports dynamic logical page sizes for memory devices in accordance with examples as disclosed herein.

FIG. 2 illustrates an example of an L2P table architecture 200 that supports dynamic logical page sizes for memory devices in accordance with examples as disclosed herein. In some examples, the L2P table architecture 200 may be implemented by a memory system such as such as memory system 110 described with reference to FIG. 1. For example, the L2P table architecture 200 may be implemented by a controller 205 and a memory device 210, which may be examples of a memory system controller 115 and a memory device 130 or 140 as described with reference to FIG. 1. In some examples, the L2P architecture 200 may be implemented in response one or more commands (e.g., one or more write commands, read commands, or other commands).

The controller 205 may store and maintain one or more tables in a local memory of the controller (e.g., a local memory 120 as described with reference to FIG. 1) that are used for mapping LBAs to corresponding L2P tables located in the memory device 210. For example, the controller 205 may maintain a main L2P table 215. The main L2P table 215 may include a quantity of entries 225 (e.g., 8 entries 225, or some other quantity of entries 225) that each map an LBA to a corresponding L2P table 220 of the memory device 210. For example, an entry 225-*a* may map an LBA to an L2P table 220-*a*. In some cases, an entry 225 may include a physical address of a corresponding L2P table 220. For example, the entry 225-*a* may include a physical address of the L2P table 220-*a*. In some cases, the entries 225 may be 4 byte (B) physical addresses.

The memory device 210 may include one or more tables that are used for mapping LBAs to physical addresses of corresponding logical pages stored in the memory device 210. For example, the memory device 210 may initially generate a set of L2P tables 220 that each include a quantity of entries 230 (e.g., 128,000 entries 230, or some other quantity of entries 230). An entry 230 may include a physical address of a logical page stored in the memory device 210. In some examples, each L2P table 220 may be associated with a maximum logical page size x supported by the memory device 210. For example, each entry 230 of an L2P table 220 may include the physical address of a logical page of size x that is stored in the memory device 210. In some cases, the entries 230 may be 4 B physical addresses.

The memory device 210 may generate lower-level L2P tables associated with logical page sizes smaller than the maximum logical page size x. For example, if the host device requests to write an amount of data that can be accommodated by a logical page of a size smaller than x, the memory device 210 may split one or more logical pages of size x into a group of two or more logical pages of the smaller size. The memory device 210 may create a new L2P table that includes the group of smaller logical pages. For example, if the host device requests to write a size of data that may be closest to a size x/2, the memory device 210 may split a logical page of size x (e.g., the logical page pointed to by entry 230-*a*) into two logical pages each of size x/2. The memory device 210 may generate an L2P table 245 associated with logical pages of size x/2. For example, the memory device 210 may create the L2P table 245 with two entries 250. A first entry 250 may include a physical address of one of the two logical pages of size x/2, and a second entry 250 may include a physical address of the other logical page of size x/2. The memory device 210 may write the data to one or both of the logical pages of size x/2 (e.g., if the size of data to be written is greater than x/2). To enable subsequent retrieval of the data, the memory device 210 may update at least a portion of the physical address of entry 230-*a* to indicate that the logical page pointed to by entry 230-*a* has been split. While the above example was described with respect to logical pages of size x/2, the memory device 210 may generate any number of additional lower-level L2P tables that are associated with a logical page size smaller than x and supported by the memory device 210. For example, the memory device 210 may generate an L2P table 255 with a quantity of entries 260 that include physical addresses of logical pages of size x/4 in response to receiving a write command from the host device.

The memory device 210 may maintain the lower-level L2P tables associated with logical page sizes smaller than the maximum logical page size x. For example, the memory device 210 may have previously generated one or more lower-level L2P tables in response to receiving write commands from the host device. If the memory device 210 determines to split a logical page of size x to two or more logical pages of a smaller size and an L2P table associated with the smaller size already exists, the memory device 210 may add entries to the existing L2P table that point to the new logical pages rather than generate an additional L2P table associated with the smaller size. For example, if the L2P table 245 exists in the memory device 210 and the memory device determines to split a logical page of size x into two logical pages of size x/2, the memory device may add two entries 250 each associated with one of the two logical pages of size x/2 instead of generating an additional L2P table 245. In this way, the additional L2P tables may be associated with multiple logical pages of size x that have been split.

The controller 205 may generate and maintain an L2P pointer table 235 in the local memory of the controller. The controller 205 may use the L2P pointer table 235 to track and locate the additional L2P tables stored in the memory device 210. For example, the L2P pointer table 240 may include a quantity of entries 240 (e.g., 8 entries 240, or some other quantity of entries 240) that each map a physical address from a corresponding entry 230 of an L2P table 220 to a physical address of a corresponding L2P table 245 of the memory device 210 that is associated with a logical page size smaller than the maximum logical page size x. In some examples, each entry 240 may be associated with a particular (e.g., respective) L2P table 245 and may track information related to the particular L2P table 245. For example, an entry 240-*a* may be associated with the L2P table 245. A first portion of the entry 240-*a* may include a physical address of the L2P table 245, and a second portion of the entry 240-*a* may track the length of the L2P table 245. For example, when the memory device 210 generates the L2P table 245, the controller 205 may create the entry 240-*a* that includes the physical address of the L2P table 245 in the first portion of the entry 240-*a* and a length (e.g., the quantity of entries 250) of the L2P table 245 in the second portion of the entry 240-*a*. If the L2P table 245 is subsequently updated (e.g., entries 250 are added to or removed from the L2P table 245), the controller may update the entry 240-*a* to specify the new length of the L2P table 245. The controller may create and update additional entries 240 in response to the memory device 210 generating and maintaining L2P tables associated with logical page sizes smaller than the maximum logical page size x. In some cases, the entries 240 may be 8B.

The controller 205 may store the main L2P table 215 and the L2P pointer table 235 in a first type of memory, and the memory device 210 may store L2P tables (e.g., L2P tables 220, 245, and 250) in a second type of memory. In some cases, the first type of memory may be SRAM, and the second type of memory may be NAND memory. In some other cases, the first type of memory and the second type of memory may be the same type of memory.

In some examples, data previously written to a logical page may become invalid or obsolete. The controller may mark or otherwise designate the data of the other logical pages as invalid or obsolete (e.g., via an UNMAP command). As a result, the other logical pages may be free to be written with new data without losing the previously stored data.

The memory device may merge two or more free logical pages of a lower-level L2P table. For example, if 4 128 KB logical pages are freed as a result of writing the data, the memory device may merge the 4 128 KB logical pages into one 512 KB logical page. The memory device may adjust a corresponding entry of the 512 KB L2P table to indicate that the logical page has not been split, and the controller may update a corresponding entry of the L2P pointer table with the new decreased length of an L2P table associated with the 128 KB logical pages. Additionally, the memory device may remove the entries of the L2P table corresponding to the 4 128 KB logical pages and shift any remaining entries of the L2P table up to occupy a gap created by the removal of the entries corresponding to the 4 128 KB logical pages. The memory device may update the offsets of any entries in corresponding 512 KB L2P tables to indicate the new locations within the L2P table. In this way, the entries of the L2P table may remain continuous.

Figure 3:
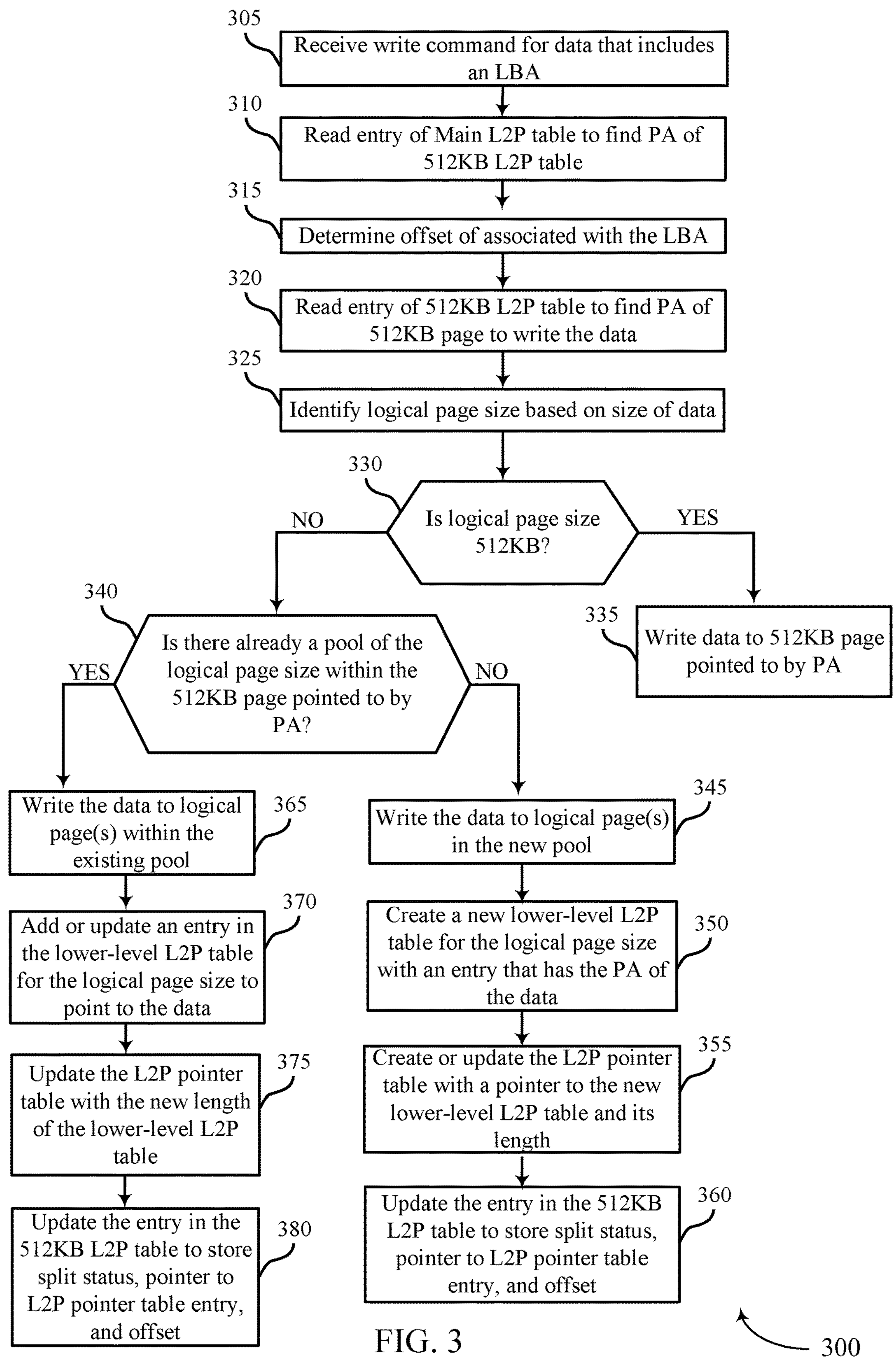
FIG. 3 illustrates an example of a process flow that supports dynamic logical page sizes for memory devices in accordance with examples as disclosed herein.

FIG. 3 illustrates an example of a process flow 300 that supports dynamic logical page sizes for memory devices in accordance with examples as disclosed herein. Process flow 300 may be performed by components of a memory system, such as memory system 110 described with reference to FIG. 1. For example, process flow 300 may be performed by a controller and a memory device such as memory system controller 115, controller 205, and memory device 130, 140, 210, as described with reference to FIGS. 1 and 2, respectively. Process flow 300 may depict a process for generating and maintaining L2P tables (such as the L2P tables depicted in FIG. 2) in response to receiving write commands from a host device. For clarity, process flow 300 uses the specific example of a memory device that has a 512 KB maximum logical page size, but similar processes apply to memory devices that have a different maximum logical page size, which are also covered under the scope of the disclosure.

At 305, the controller may receive a write command from a host device. The write command may include data to be written to the memory device and an LBA that the host device has assigned to the data and may subsequently use to read the data.

In some examples, the controller may store virtual block information associated with the memory device and may assign a physical address of the data to be written based on the virtual block information. For example, the memory device may include one or more dies (e.g., dies 160) that each include one or more planes (e.g., planes 165). In some cases, a virtual block may be defined as a set of blocks of the same block number from all of the planes of the memory device. For example, if the memory device include four dies and each of the dies includes four planes, then a virtual block 0 may be the set of blocks {die 0 plane 0 block 0, die 0 plane 1 block 0, die 0 plane 2 block 0, . . . , die 2 plane 0 block 0, . . . , die 3 plane 2 block 0, die 3 plane 3 block 0}. In some other cases, a virtual block may be defined as a subset of memory cells of a block (e.g., a block 170) included in the memory device. The controller may track which virtual blocks of the memory device are free, assign a physical address to the data based on which virtual blocks are free, and write the data to the assigned physical address of the memory device.

In some examples, the controller may create a mapping between the LBA assigned to the data and the physical address of the data stored in the memory device and may store the mapping in a change log stored in the controller. The controller may subsequently use the mapping stored in the change log to read the data. In some cases, the controller may determine to erase the mappings stored in the change log (e.g., due to change log size restrictions, entering a low power mode). To avoid losing the mappings, the controller may determine to store the mappings in one or more L2P tables stored in the memory device. In some cases, 310 to 380 may be implemented in response to the controller determining to store the mappings in the one or more L2P tables. In some other cases, 310 to 380 may be implemented in response to receiving the write command from the host device at 305.

At 310, the controller may use the LBA as an index to read an entry in a main L2P table (e.g., entry 225-*a* in main L2P table 215) associated with the LBA. The main L2P table may be stored in SRAM of the memory device, for example. The entry may include a physical address that points to a 512 KB L2P table (e.g., L2P table 220-*a*).

At 315, the controller may determine (e.g., identify) an offset associated with the LBA to determine a particular entry of the 512 KB L2P table. For example, the physical address may point to the 512 KB L2P table and the controller may add the offset to this physical address to determine a physical address of the particular entry in the 512 KB L2P table. As one example, the controller may determine the offset at 315 based on a portion of bits included in the LBA—e.g., some quantity of most significant bits of the LBA may identify an entry 225 (e.g., entry 225-*a* in main L2P table 215) associated with the LBA, and some other quantity of bits (e.g., the remaining bits or some other portion of less significant bits) may identify the offset determined at 315. Or as another example, the entry 225 in main L2P table 215 may store an indication of the offset determined at 315.

The 512 KB L2P table may include entries that either (1) point directly to a 512 KB logical page (if the 512 KB logical page has not been split into smaller logical pages), or (2) include an indication that the 512 KB has been split into smaller logical page sizes, along with an offset value that may subsequently be used to locate the data in the smaller logical page. The 512 KB L2P table and corresponding 512 KB logical pages may be stored in NAND memory of the memory device, for example.

At 320, the controller may read an entry in the 512 KB L2P table located at the physical address determined at 315. The entry may include a physical address of a 512 KB logical page at which to write the data received from the host.

At 325, the controller may identify a logical page size based on the size of the data that the host has requested to write in the write command. (Although process flow 300 depicts 325 as occurring after 320, in some examples, 325 may occur before 310, 315, or 320, or concurrently with 310, 315, or 320). The controller may identify the logical page size by selecting a logical page size from a set of logical page sizes supported by the memory device. For example, the memory device may support logical page sizes of 512 KB, 256 KB, 128 KB, 64 KB, 32 KB, 16 KB, 8 KB, and 4 KB. The controller may select the logical page size that is closest to the size of the data requested to be written by the host. The selected logical page size may be larger or smaller than the size of the data, and may be selected to optimize various aspects (e.g., to minimize a total quantity of logical pages, to minimize a quantity of L2P table entries, or to optimize some other aspect). For example, if the host requests to write 400 KB of data, the controller may select a logical page size of 512 KB, and may write the data to a single 512 KB logical page. If the host device requests to write 5 KB of data, the controller may select a logical page size of 4 KB, and may write the data to two 4 KB logical pages. That is, the controller may write a first portion of the data to a first 4 KB logical page and write a second portion of the data to a second 4 KB logical page.

At 330, the controller may determine whether the selected logical page size is 512 KB (e.g., the maximum logical page size associated with the memory device).

If the selected logical page size is 512 KB, then at 335, the controller may write the data to the 512 KB logical page that is pointed to by the physical address read from the 512 KB L2P table at 320. In this case, the entry in the lower-level L2P table continues to point to the 512 KB logical page at which the data is stored, and thus is not updated.

If the selected logical page size is not 512 KB, then at 340, the controller may determine whether there is already a pool of logical pages that have the selected logical page sizes within the 512 KB page pointed to by the second-level L2P table. For example, if the selected logical page size is 128 KB, the controller may determine whether the 512 KB logical page pointed to has already been split into 128 KB logical pages.

If the 512 KB page has not already been split into a pool of logical pages having the selected logical page size, then the controller and/or memory device may perform 345 through 360, as follows. In this case, the memory device may not yet have created a lower-level L2P table (e.g., with respect to the 512 KB L2P table) that points to logical pages within the pool, and therefore may create such an L2P table.

At 345, the memory device may split the 512 KB logical page into a pool of logical pages having the selected logical page size and write the data to one or more logical pages within the pool. Further details of splitting the 512 KB logical page are described herein with reference to FIG. 4 below.

At 350, the memory device may create a new second-level L2P table (e.g., L2P table 255) for the selected logical page size with an entry that includes the physical address of the data.

At 355, the controller may update an L2P pointer table (e.g., L2P pointer table 235) by adding an entry to an L2P pointer table that includes (1) the physical address of the new lower-level L2P table associated with the selected logical page size and (2) the length of the lower-level L2P table in terms of the quantity of entries. In some examples, the controller may create the L2P pointer table and add the entry to the L2P pointer table if no lower-level L2P tables were previously created or if all lower-level L2P tables were previously erased.

At 360, the memory device may update the entry in the 512 KB L2P table that was read at 320 to indicate that this 512 KB logical page has been split into smaller logical page sizes, and an offset that may be used to locate the data within the smaller logical pages. For example, the memory device may store a value in the most-significant bit (MSB) that indicates that the 512 KB logical page has been split, and three additional bits (e.g., bits 28, 29, 30 of a 4B entry) that may point to an entry of the L2P pointer table associated with the selected logical page size. In some examples, the offset may be stored in the remaining bits (e.g., bits 0 to 27 of a 4B entry) of the entry in the 512 KB L2P table.

If the 512 KB page has already been split into a pool of logical pages having the selected logical page size, then the controller and/or memory device may perform 365 through 375, as follows. In this case, the memory device may have already created a lower-level L2P table associated with the selected logical page size.

At 365, the memory device may write the data to one or more logical pages within the pool of logical pages.

At 370, the memory device may add or update an entry in the corresponding lower-level L2P table with a physical address that points to the data. The length of the lower-level L2P table may therefore be increased.

At 375, the memory device may update an entry in the L2P pointer table that points to the lower-level L2P table to reflect the new length of the lower-level L2P table.

At 380, the memory device may update the entry in the 512 KB L2P table that was read at 320 to indicate that this 512 KB logical page has been split into smaller logical page sizes, and an offset that may be used to locate the data within the smaller logical pages. For example, the memory device may store a value in the MSB that indicates that the 512 KB logical page has been split, and three additional bits (e.g., bits 28, 29, 30 of a 4B entry) that may point to an entry of the L2P pointer table associated with the selected logical page size. In some examples, the offset may be stored in the remaining bits (e.g., bits 0 to 27 of a 4B entry) of the entry in the 512 KB L2P table.

Figure 4:
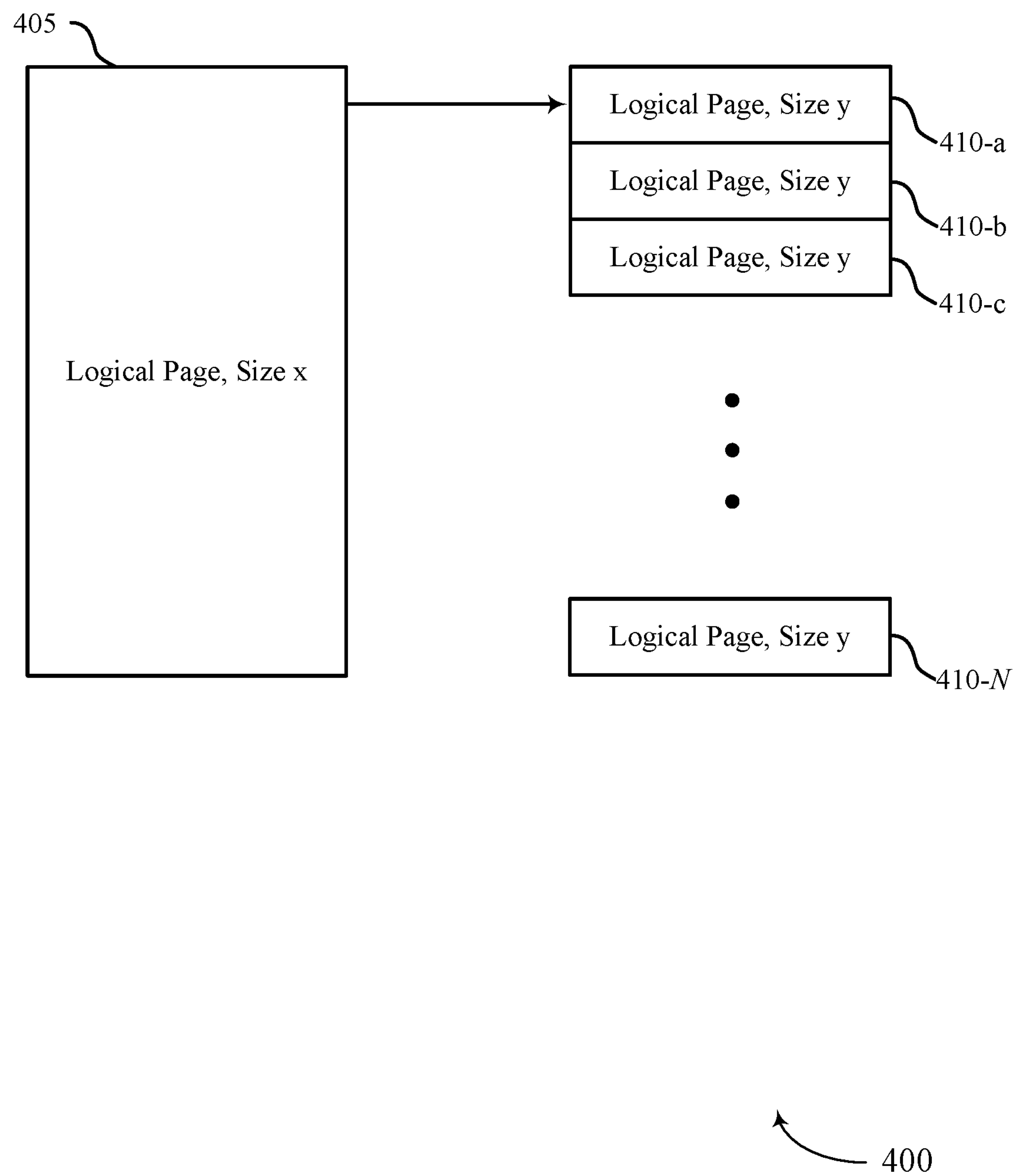
FIG. 4 illustrates an example of an operational flow supports dynamic logical page sizes for memory devices in accordance with examples as disclosed herein.

FIG. 4 illustrates an example of an operational flow 400 that supports dynamic logical page sizes for memory devices in accordance with examples as disclosed herein. In some examples, operation flow 400 may be performed by a memory device (such as a memory device 130, 140, or 210) in response to receiving a command (e.g., from a host device) to write a size of data that is smaller than a maximum supported logical page size supported by the memory device.

A memory device may include one or more logical pages that support the maximum supported logical page size x (e.g., a 512 KB logical page size). For example, the memory device may include a logical page 405 that has a logical page size x. In some examples, a host device may request to write an amount of data that is a size less than x. The memory device may split the logical page 405 into smaller logical pages in order to accommodate the data. For example, the memory device may split the logical page 405 into N logical pages 410 of size y, where y is less than x and is a size of a logical page size supported by the memory device. The memory device may then write the data to one or more of the logical pages 410. In some cases, the memory device may create a lower-level L2P table with entries including the physical addresses of the logical pages 410. In some other cases, the memory device may add entries including the physical addresses of the logical pages 410 to an existing lower-level L2P table associated with logical pages of size y.

The logical page 405 may be associated with an L2P table containing entries that point to logical pages of size x. For example, an entry of the L2P table may include the physical address of the logical page 405. After splitting the logical page 405, the memory device may update the entry of the L2P table to indicate that the logical page 405 has been split into the logical pages 410. Additionally, the memory device may update the entry to indicate an offset within a lower-level L2P table associated with the logical pages 410 where the data is located. For example, the memory device may store a value in the MSB that indicates that the 512 KB logical page has been split, and three additional bits (e.g., bits 28, 29, 30 of a 4B entry) that may point to an entry of an L2P pointer table associated with the selected logical page size. It is to be understood that this any other specific numeric example provided herein is for the sake of illustrative clarity only and is not limiting, of the claims or otherwise. In some examples, the offset may be stored in the remaining bits of the entry associated with the logical page 405. In some examples, if the MSB is 0, the controller may determine that the logical page 405 has not been split, and if the MSB is 1, the controller may determine that the 512 KB logical page has been split. In some other examples, the opposite may be true.

In an example, the three additional bits may be used to point to an entry of the L2P pointer table according to the following (given that the MSB indicates that the 512 KB logical page has been split). If the three additional bits in the entry are 000, then the logical page has been split into two 256 KB pages, and some or all of the remaining bits of the entry may denote the offset in 256 KB addresses. If the three additional bits in the entry are 001, then the logical page has been split into 4 128 KB pages, and the remaining bits of the entry denote the offset in 128 KB addresses. If the three additional bits in the entry are 010, then the logical page has been split into 8 64 KB pages, and the remaining bits of the entry denote the offset in 64 KB addresses. If the three additional bits in the entry are 011, then the logical page has been split into 16 32 KB pages, and the remaining bits of the entry denote the offset in 32 KB addresses. If the three additional bits in the entry are 100, then the logical page has been split into 32 16 KB pages, and the remaining bits of the entry denote the offset in 16 KB addresses. If the three additional bits in the entry are 101, then the logical page has been split into 64 8 KB pages, and the remaining bits of the entry denote the offset in 8 KB addresses. If the three additional bits in the entry are 110, then the logical page has been split into 128 4 KB pages, and the remaining bits of the entry denote the offset in 4 KB addresses. Thus, when a memory device splits a logical page 405, an entry of an L2P table that points to the logical page 405 may be updated to indicate the location of the smaller logical pages. Other examples and combinations of the three additional bits may be possible to denote different logical page splits, and the example provided above should not be considered limiting in scope.

Figure 5:
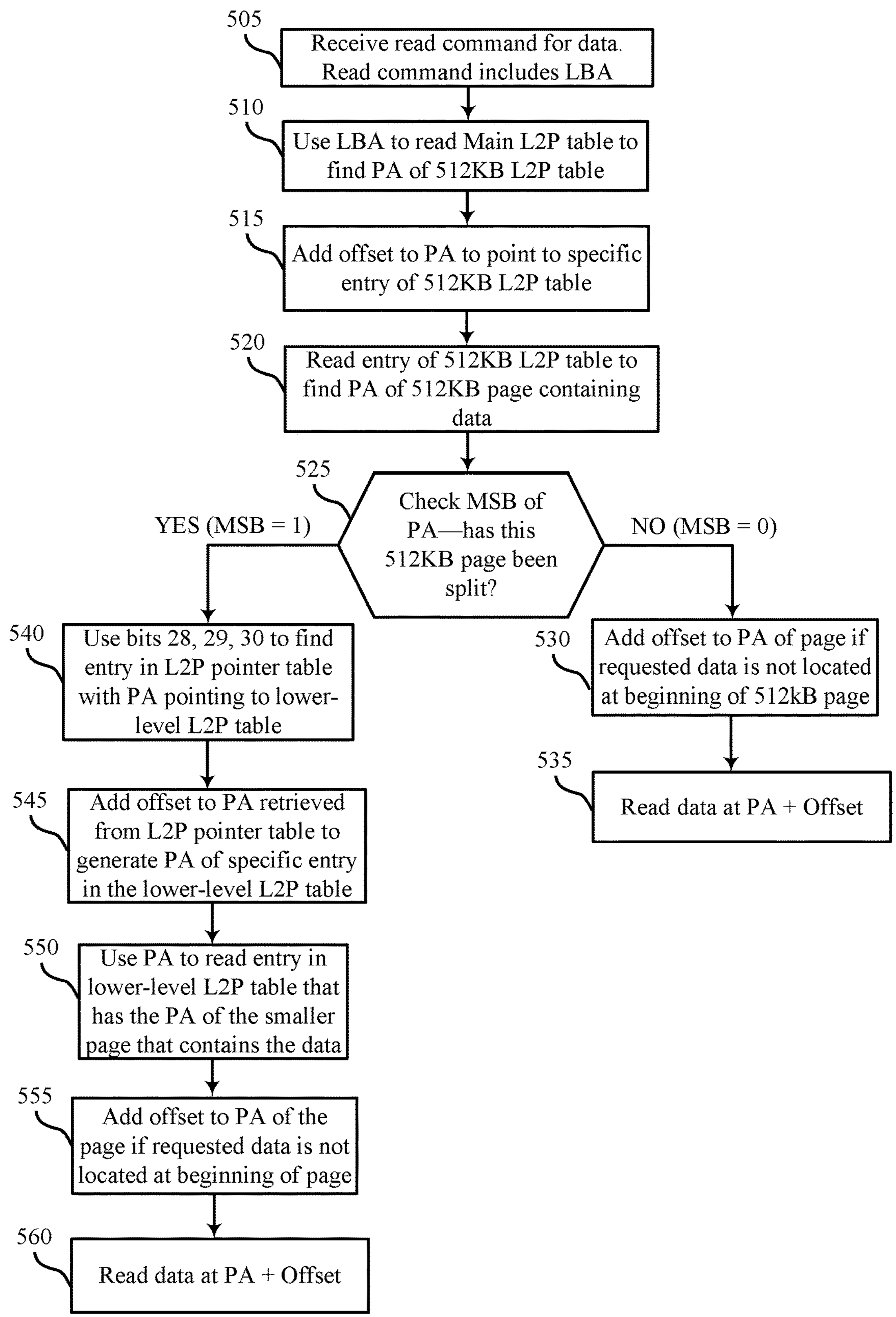
FIG. 5 illustrates an example of a process flow that supports dynamic logical page sizes for memory devices in accordance with examples as disclosed herein.

FIG. 5 illustrates an example of a process flow 500 that supports dynamic logical page sizes for memory devices in accordance with examples as disclosed herein. Process flow 500 may be performed by components of a memory system, such as memory system 110 described with reference to FIG. 1. For example, process flow 500 may be performed by a controller and a memory device such as memory system controller 115, controller 205, and memory device 130, 140, 210, as described with reference to FIGS. 1 and 2, respectively. Process flow 500 may depict a process for using L2P tables (such as the L2P tables depicted in FIG. 2 and described with reference to FIG. 3) to locate data in a memory device in response to receiving a read command from a host device. For clarity, process flow 500 uses the specific example of a memory device that has a 512 KB maximum logical page size, but similar processes apply to memory devices that have a different maximum logical page size, which are also covered under the scope of the disclosure.

At 505, the controller may receive a read command from a host device. The read command may include an LBA of data to be read from the memory device.

At 510, the controller may use the LBA as an index to read an entry in a main L2P table (e.g., entry 225-*a* in main L2P table 215) associated with the LBA. The main L2P table may be stored in SRAM of the memory device, for example. The entry may include a physical address that points to a 512 KB L2P table (e.g., L2P table 220).

The 512 KB L2P table may include entries that either (1) point directly to a 512 KB logical page (if the 512 KB logical page has not been split into smaller logical pages), or (2) include an indication that the 512 KB has been split into smaller logical page sizes, along with an offset value that may subsequently be used to locate the data in the smaller logical page. The 512 KB L2P table and corresponding 512 KB logical pages may be stored in NAND memory of the memory device, for example.

At 515, the controller may add an offset to the physical address retrieved from the main L2P table to determine a physical address of a particular entry in the 512 KB L2P table based on the LBA.

At 520, the controller may read an entry in the 512 KB L2P table located at the physical address generated at 515. As previously described, the entry may include either (1) a physical address that points directly to a 512 KB logical page containing the data (if the 512 KB logical page has not been split into smaller logical pages), or (2) an indication that the 512 KB has been split into smaller logical page sizes for storing the data, along with an offset value that may be used to locate the data within the smaller logical pages.

At 525, the controller may determine whether the 512 KB page has been split into smaller logical pages based on the entry read at 520. In the example shown in FIG. 5, the controller may determine whether the 512 KB page has been split based on the value in the MSB of the entry. If the MSB is 0, then the controller may determine that the 512 KB logical page has not been split into smaller logical pages. If the MSB is 1, then the controller may determine that the 512 KB logical page has been split into smaller logical pages. Other bits in the entry may be used to indicate whether a large logical page has been split into smaller logical pages without departing from the scope of the disclosure.

If the controller determines at 525 that the 512 KB logical page has not been split, then at 530, the controller may add an offset to the physical address retrieved at 520 to determine a physical address of the start of the requested data (if the requested data is not located at the starting physical address for the 512 KB logical page).

At 535, the controller may then read the requested data starting at the physical address determined at 530 and transmit the data to the host device.

If the controller determines at 525 that the 512 KB logical page has been split, then the controller may perform 540 through 560, as follows.

At 540, the controller may use a portion of the entry retrieved at 520 to identify an entry in an L2P pointer table that points to a lower-level L2P table associated with the location of the data. In the example shown in FIG. 5, the controller may use bits 28, 29, and 30 of the entry to find the relevant entry in the L2P pointer table and may retrieve this entry from the L2P pointer table. In this manner, bits 28, 29, and 30 may be used to indicate the logical page size to which the data was previously written, because each entry in the L2P pointer table may be associated with an L2P table for a particular logical page size.

The entry in the L2P pointer table may include a physical address of the relevant lower-level L2P table (e.g., the lower-level L2P table associated with the logical page size within which the data is stored) and a length of the lower-level L2P table.

At 545, the controller may add an offset to the physical address retrieved from the L2P pointer table to generate the physical address of a specific entry of the lower-level L2P table. In some examples, the remaining bits of the entry retrieved at 520 (e.g., bits 0 to 27) may indicate the value of the offset, and the controller may calculate the offset to add to the physical address based on reading the remaining bits.

At 550, the controller may read the entry of the lower-level L2P table located at the physical address generated at 545, and may retrieve the physical address of the smaller logical page that contains the requested data.

If the requested data is not located at the beginning of the smaller logical page, at 555, the controller may add an offset to the physical address retrieved at 550 to determine a physical address of the location of the data within the smaller logical page.

At 560, the controller may read the data starting from a location within the smaller logical page pointed to by the physical address generated at 555, and may then transmit the data to the host device.

Figure 6:
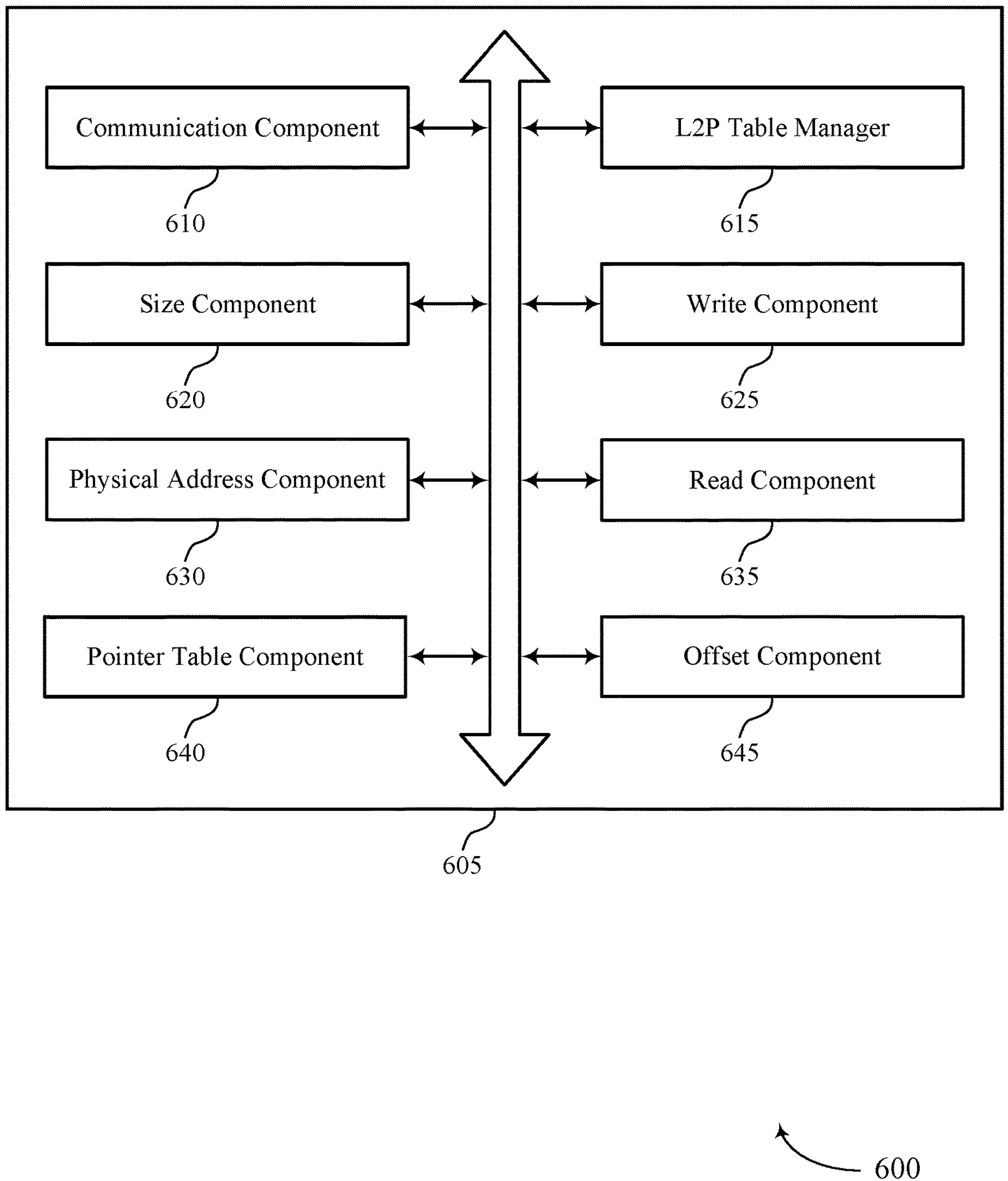
FIG. 6 shows a block diagram of a memory system that supports dynamic logical page sizes for memory devices in accordance with aspects of the present disclosure.

FIG. 6 shows a block diagram 600 of a memory system 605 that supports dynamic logical page sizes for memory devices in accordance with examples as disclosed herein. The memory system 605 may be an example of aspects of a memory system as described with reference to FIGS. 1 through 5. The memory system 605 may include a communication component 610, an L2P table manager 615, a size component 620, a write component 625, a physical address component 630, a read component 635, a pointer table component 640, and an offset component 645. Each of these modules may communicate, directly or indirectly, with one another (e.g., via one or more buses).

In some example, the communication component 610 may receive a write command for writing a first amount of data to a memory device, the write command associated with a logical address. In some cases, the communication component 610 may receive a second write command for writing a second amount of data to the memory device, the second write command including a second logical address.

In some examples, the communication component 610 may receive a read command associated with a first logical address that is associated with a starting location of data stored in a memory device. In some cases, the communication component 610 may transmit the data to a host device for the memory device.

With reference to the communication component 610 receiving the write command, the L2P table manager 615 may read, based on the logical address, a first entry of a first L2P table, where the first L2P table is for mapping a set of logical addresses to physical addresses of a corresponding first set of logical pages of the memory device that each have a first logical page size, and where the first entry of the first L2P table includes a first physical address of a first logical page of the first set of logical pages.

In some examples, the L2P table manager 615 may read, based on the logical address, a first entry of a main L2P table for mapping a set of logical addresses to a corresponding set of L2P tables including the first L2P table, the first entry of the main L2P table including a third physical address that points to the first L2P table, where reading the first entry of the first L2P table includes reading the first entry of the first L2P table based on the third physical address.

With reference to the communication component 610 receiving the second write command, in some examples, the L2P table manager 615 may read, based on the second logical address, a second entry of a third L2P table for mapping a third set of logical addresses to physical addresses of a corresponding third set of logical pages of the memory device that each have the first logical page size, the second entry of the third L2P table including a fifth physical address of a third logical page of the third set of logical pages.

In some examples, the L2P table manager 615 may read, based on the second logical address, a second entry of a third L2P table for mapping a third set of logical addresses to physical addresses of a corresponding third set of logical pages of the memory device that each have the first logical page size, the second entry of the third L2P table including a fifth physical address of a third logical page of the third set of logical pages.

With reference to the communication component 610 receiving the read command, the L2P table manager 615 may read a first entry of a first L2P table based on the logical address, where the first entry includes a first physical address of a first logical page of the memory device having a first logical page size, and where a value of a first portion of the first physical address indicates a second logical page size of a second logical page of memory that contains the data, the first logical page including the second logical page.

In some examples, the L2P table manager 615 may read, based on identifying a value of a second portion of the first physical address, a first entry of the L2P pointer table, the first entry of the L2P pointer table including a third physical address.

In some examples, the L2P table manager 615 may read a third entry of a main L2P table based on the logical address, where the third entry includes a third physical address that points to the first L2P table.

With reference to the communication component 610 receiving the write command, the size component 620 may identify, based on a size of the first amount of data, a second logical page size. In some examples, the size component 620 may select the second logical page size from the set of supported logical page sizes.

With reference to the communication component 610 receiving the second write command, in some examples, the size component 620 may identify, based on a second size of the second amount of data, a third logical page size. In some cases, the size component 620 may identify that the second amount of data corresponds to the first logical page size.

With reference to the communication component 610 receiving the read command, the size component 620 may determine, based on the value of the first portion of the first physical address, whether the second logical page size is different than the first logical page size.

The write component 625 may write, based on the first physical address, at least a portion of the first amount of data to a second logical page of the memory device having the second logical page size, the first logical page including the second logical page. In some examples, the write component 625 may write at least a portion of the second amount of data to a fourth logical page of the memory device having the third logical page size, where the third logical page includes the fourth logical page. In some cases, the write component 625 may write the second amount of data to the third logical page.

In some examples, the L2P table manager 615 may store, based on the size component 620 identifying the second logical page size, a first entry of a second L2P table for mapping a second set of logical addresses to physical addresses of a corresponding second set of logical pages of the memory device, each logical page of the second set of logical pages having the second logical page size, where the first entry in the second L2P table includes a second physical address of the second logical page.

With reference to the communication component 610 receiving the read command, the physical address component 630 may determine, based on the determination of whether the second logical page size is different than the first logical page size, a second physical address that points to the starting location of the data within the second logical page.

In some examples, the physical address component 630 may identify a value of a second portion of the first physical address, where the value of the second portion of the first physical address points to a first entry of an L2P pointer table.

The read component 635 may read the data from the starting location of the data within the second logical page based on determining the second physical address. In some examples, the read component 635 may read based on identifying the value of the second portion of the first physical address, a first entry of the L2P pointer table, the first entry of the L2P pointer table comprising a third physical address. In some examples, the read component 635 may read a first portion of data from the second logical page. In some cases, the read component 635 may read a second portion of the data from a third logical page having the same logical page size as the second logical page.

With reference to the communication component 610 receiving the write command, the pointer table component 640 may store, based on identifying the second logical page size, a first entry in an L2P pointer table, the first entry in the L2P pointer table including a fourth physical address and a length of the second L2P table, where the fourth physical address points to the second L2P table.

In some examples, the pointer table component 640 may determine that two or more logical pages having the second logical page size and pointed to by the second L2P table have been deleted. In some cases, the pointer table component 640 may update, based on the determination that the two or more logical pages have been deleted, the length of the second L2P table in the L2P pointer table and the length of the first L2P table in the first L2P pointer table.

With reference to the communication component 610 receiving the read command, the offset component 645 may add an offset to the third physical address to determine a fourth physical address associated with a second entry in a second L2P table, where the offset is indicated by a third portion of the first physical address. In some examples, the read component 635 may read the second entry of the second L2P table, where the second entry of the second L2P table includes at least a portion of the second physical address.

In some examples, the offset component 645 may add a second offset to the second entry of the second L2P table to generate the second physical address.

In some examples, the offset component 645 may add an offset to the first physical address to determine the second physical address.

With reference to the communication component 610 receiving the read command, in some examples, the read component 635 may read a third entry of a main L2P table based on the logical address, where the third entry comprises a third physical address that points to the first L2P table. In some cases, the offset component 645 may add a third offset to the third physical address to generate a fourth physical address that points to the first entry of the first L2P table, where reading the first entry of the first L2P table includes reading the first entry of the first L2P table based on the fourth physical address.

Figure 7:
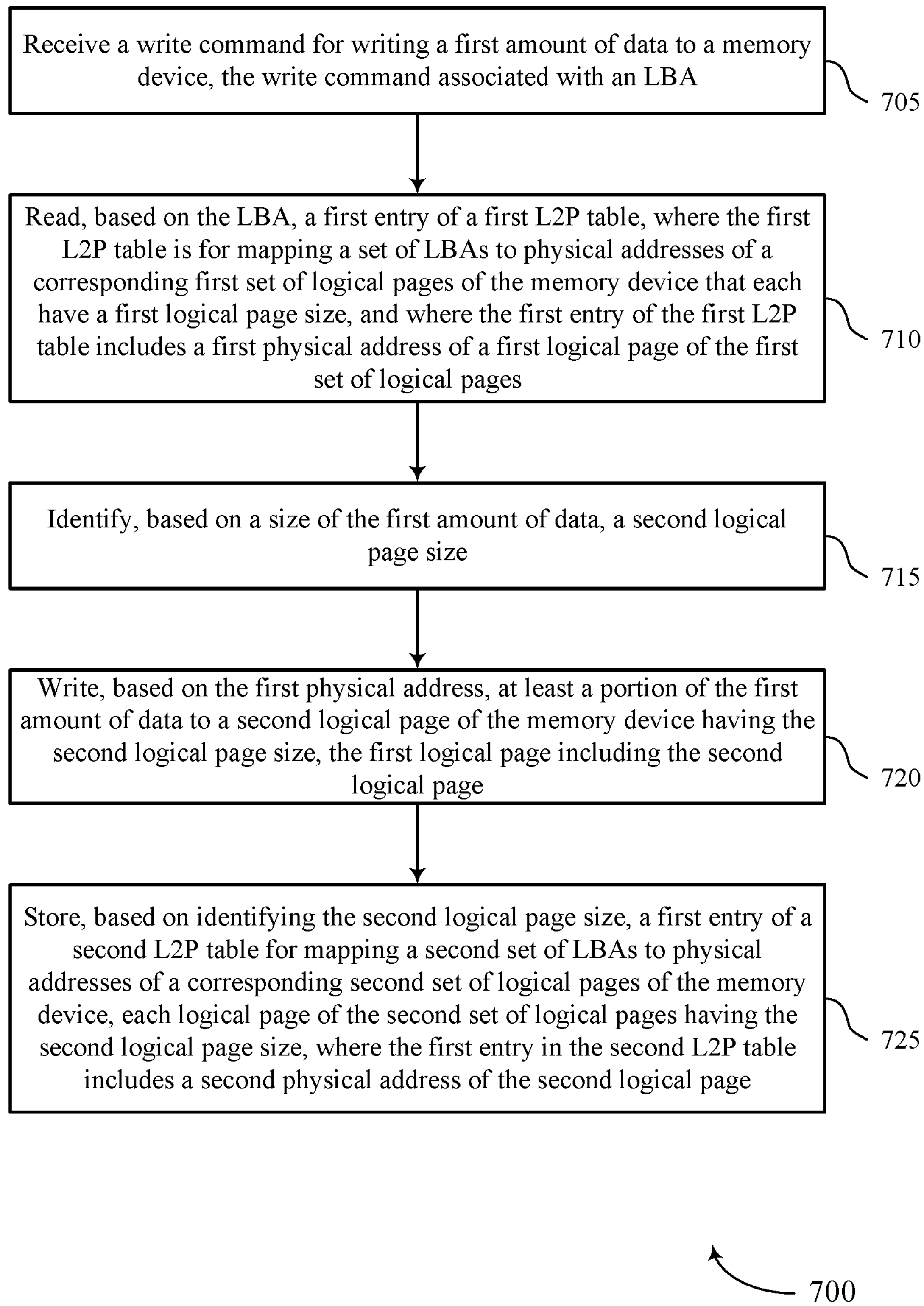
FIGS. 7 and 8 show flowcharts illustrating a method or methods that support dynamic logical page sizes for memory devices in accordance with examples as disclosed herein.

FIG. 7 shows a flowchart illustrating a method or methods 700 that supports dynamic logical page sizes for memory devices in accordance with aspects of the present disclosure. The operations of method 700 may be implemented by a memory system or its components as described herein. For example, the operations of method 700 may be performed by a memory system as described with reference to FIG. 6. In some examples, a memory system may execute a set of instructions to control the functional elements of the memory system to perform the described functions. Additionally or alternatively, a memory system may perform aspects of the described functions using special-purpose hardware.

At 705, the memory system may receive a write command for writing a first amount of data to a memory device, the write command associated with a logical address. The operations of 705 may be performed according to the methods described herein. In some examples, aspects of the operations of 705 may be performed by a communication component as described with reference to FIG. 6.

In some examples, the memory system may store virtual block information associated with the memory device and may assign a physical address of the data to be written based on the virtual block information. For example, the memory system may track which virtual blocks of the memory device are free, assign a physical address to the data based on which virtual blocks are free, and write the data to the assigned physical address of the memory device. In some examples, the memory system may create a mapping between the LBA assigned to the data and the physical address of the data stored in the memory device and may store the mapping in a change log stored in the memory system. The memory system may subsequently use the mapping stored in the change log to read the data. In some cases, the memory system may determine to erase the mappings stored in the change log (e.g., due to change log size restrictions, entering a low power mode). To avoid losing the mappings, the memory system may determine to store the mappings in one or more L2P tables stored in the memory device. In some cases, 710 to 725 may be implemented in response to the memory system determining to store the mappings in the one or more L2P tables. In some other cases, 710 to 725 may be implemented in response to receiving the write command from the host device at 705.

At 710, the memory system may read, based on the logical address, a first entry of a first L2P table, where the first L2P table is for mapping a set of logical addresses to physical addresses of a corresponding first set of logical pages of the memory device that each have a first logical page size, and where the first entry of the first L2P table includes a first physical address of a first logical page of the first set of logical pages. The operations of 710 may be performed according to the methods described herein. In some examples, aspects of the operations of 710 may be performed by a L2P table manager as described with reference to FIG. 6.

At 715, the memory system may identify, based on a size of the first amount of data, a second logical page size. The operations of 715 may be performed according to the methods described herein. In some examples, aspects of the operations of 715 may be performed by a size component as described with reference to FIG. 6.

At 720, the memory system may write, based on the first physical address, at least a portion of the first amount of data to a second logical page of the memory device having the second logical page size, the first logical page including the second logical page. The operations of 720 may be performed according to the methods described herein. In some examples, aspects of the operations of 720 may be performed by a write component as described with reference to FIG. 6.

At 725, the memory system may store, based on identifying the second logical page size, a first entry of a second L2P table for mapping a second set of logical addresses to physical addresses of a corresponding second set of logical pages of the memory device, each logical page of the second set of logical pages having the second logical page size, where the first entry in the second L2P table includes a second physical address of the second logical page. The operations of 725 may be performed according to the methods described herein. In some examples, aspects of the operations of 725 may be performed by a L2P table manager as described with reference to FIG. 6.

In some examples, an apparatus as described herein may perform a method or methods, such as the method 700. The apparatus may include features, means, or instructions (e.g., a non-transitory computer-readable medium storing instructions executable by a processor) for receiving a write command for writing a first amount of data to a memory device, the write command associated with a logical address, reading, based on the logical address, a first entry of a first L2P table, where the first L2P table is for mapping a set of logical addresses to physical addresses of a corresponding first set of logical pages of the memory device that each have a first logical page size, and where the first entry of the first L2P table includes a first physical address of a first logical page of the first set of logical pages, identifying, based on a size of the first amount of data, a second logical page size, writing, based on the first physical address, at least a portion of the first amount of data to a second logical page of the memory device having the second logical page size, the first logical page including the second logical page, and storing, based on identifying the second logical page size, a first entry of a second L2P table for mapping a second set of logical addresses to physical addresses of a corresponding second set of logical pages of the memory device, each logical page of the second set of logical pages having the second logical page size, where the first entry in the second L2P table includes a second physical address of the second logical page.

Some examples of the method 700 and the apparatus described herein may further include operations, features, means, or instructions for reading, based on the logical address, a first entry of a main L2P table for mapping a set of logical addresses to a corresponding set of L2P tables including the first L2P table, the first entry of the main L2P table including a third physical address that points to the first L2P table, where reading the first entry of the first L2P table includes reading the first entry of the first L2P table based on the third physical address.

In some cases of the method 700 and the apparatus described herein, the main L2P table may be stored in a first type of memory, and the first L2P table may be stored in a second type of memory.

Some examples of the method 700 and the apparatus described herein may further include operations, features, means, or instructions for storing, based on identifying the second logical page size, a first entry in an L2P pointer table, the first entry in the L2P pointer table including a fourth physical address and a length of the second L2P table, where the fourth physical address points to the second L2P table.

Some examples of the method 700 and the apparatus described herein may further include operations, features, means, or instructions for receiving a second write command for writing a second amount of data to the memory device, the second write command including a second logical address, reading, based on the second logical address, a second entry of a third L2P table for mapping a third set of logical addresses to physical addresses of a corresponding third set of logical pages of the memory device that each may have the first logical page size, the second entry of the third L2P table including a fifth physical address of a third logical page of the third set of logical pages, identifying, based on a second size of the second amount of data, a third logical page size, and writing at least a portion of the second amount of data to a fourth logical page of the memory device having the third logical page size, where the third logical page includes the fourth logical page.

In some cases of the method 700 and the apparatus described herein, the third logical page size may be a different size than the second logical page size, and the method 700 and the apparatus described herein may further include operations, features, means, or instructions for storing, based on identifying the third logical page size, a second entry in the L2P pointer table, the second entry in the L2P pointer table including a sixth physical address and a length of a fourth L2P table, where the sixth physical address points to the fourth L2P table associated with the fourth logical page.

In some implementations of the method 700 and the apparatus described herein, the third logical page size may be the same size as the second logical page size, and the method 700 and the apparatus described herein may further include operations, features, means, or instructions for updating the length of the second L2P table in the first entry of the L2P pointer table based on the third logical page size being the same size as the second logical page size.

In some examples of the method 700 and the apparatus described herein, the first L2P table and the third L2P table may be the same L2P table.

In some cases of the method 700 and the apparatus described herein, the first L2P table and the third L2P table may be different L2P tables.

Some examples of the method 700 and the apparatus described herein may further include operations, features, means, or instructions for determining that two or more logical pages having the second logical page size and pointed to by the second L2P table may have been deleted, and updating, based on the determination that the two or more logical pages may have been deleted, the length of the second L2P table in the L2P pointer table and the length of the first L2P table in the first L2P pointer table.

Some examples of the method 700 and the apparatus described herein may further include operations, features, means, or instructions for receiving a second write command for writing a second amount of data to the memory device, the second write command including a second logical address, reading, based on the second logical address, a second entry of a third L2P table for mapping a third set of logical addresses to physical addresses of a corresponding third set of logical pages of the memory device that each may have the first logical page size, the second entry of the third L2P table including a fifth physical address of a third logical page of the third set of logical pages, identifying that the second amount of data corresponds to the first logical page size, and writing the second amount of data to the third logical page.

In some examples of the method 700 and the apparatus described herein, the first logical page size may be a maximum logical page size of a set of supported logical page sizes associated with the memory device, the set of supported logical page sizes including the second logical page size.

In some examples of the method 700 and the apparatus described herein, identifying the second logical page size may include operations, features, means, or instructions for selecting the second logical page size from the set of supported logical page sizes.

Figure 8:
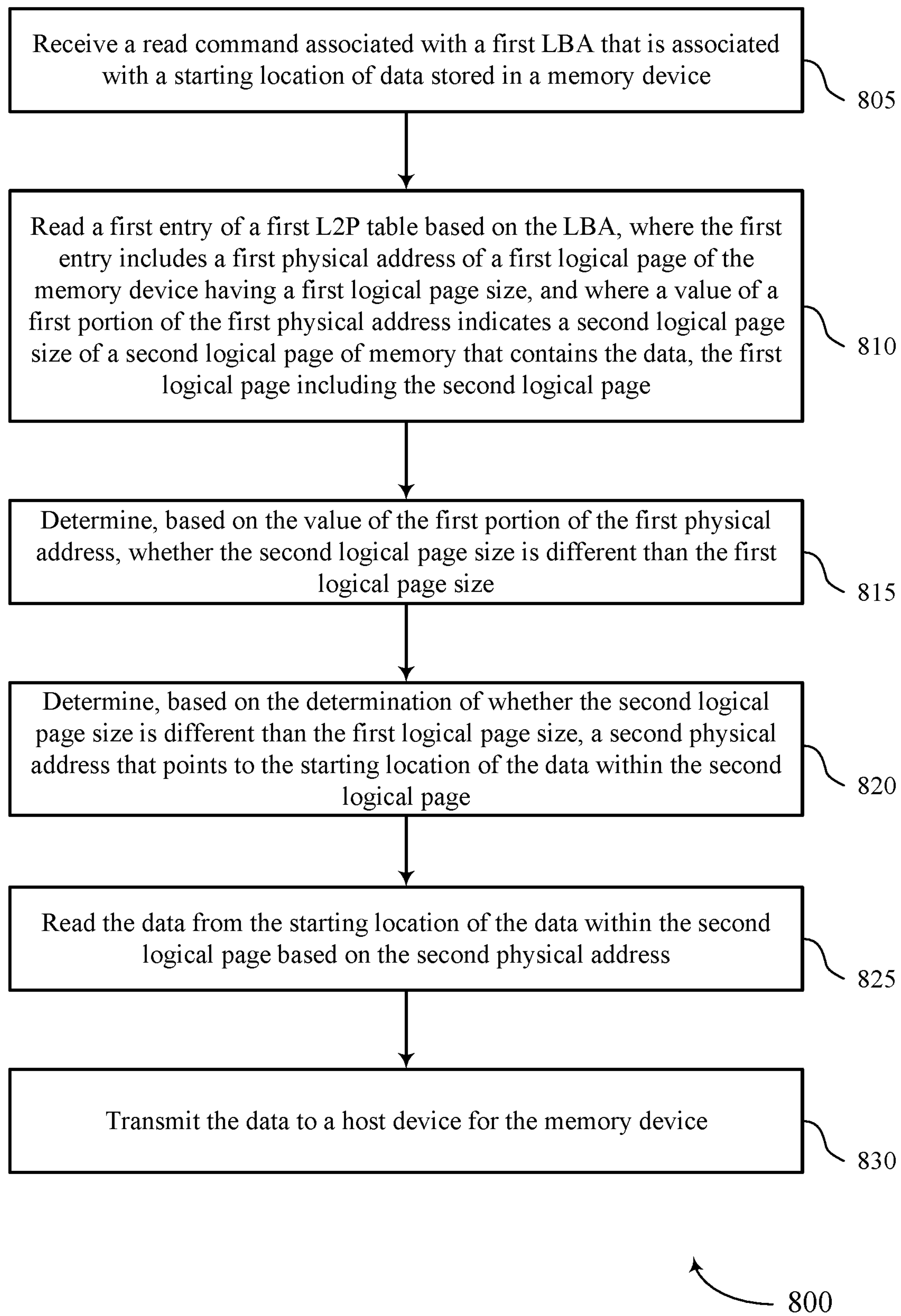

FIG. 8 shows a flowchart illustrating a method or methods 800 that supports dynamic logical page sizes for memory devices in accordance with aspects of the present disclosure. The operations of method 800 may be implemented by a memory system or its components as described herein. For example, the operations of method 800 may be performed by a memory system as described with reference to FIG. 6. In some examples, a memory system may execute a set of instructions to control the functional elements of the memory system to perform the described functions. Additionally or alternatively, a memory system may perform aspects of the described functions using special-purpose hardware.

At 805, the memory system may receive a read command associated with a first logical address that is associated with a starting location of data stored in a memory device. The operations of 805 may be performed according to the methods described herein. In some examples, aspects of the operations of 805 may be performed by a communication component as described with reference to FIG. 6.

At 810, the memory system may read a first entry of a first L2P table based on the logical address, where the first entry includes a first physical address of a first logical page of the memory device having a first logical page size, and where a value of a first portion of the first physical address indicates a second logical page size of a second logical page of memory that contains the data, the first logical page including the second logical page. The operations of 810 may be performed according to the methods described herein. In some examples, aspects of the operations of 810 may be performed by a L2P table manager as described with reference to FIG. 6.

At 815, the memory system may determine, based on the value of the first portion of the first physical address, whether the second logical page size is different than the first logical page size. The operations of 815 may be performed according to the methods described herein. In some examples, aspects of the operations of 815 may be performed by a size component as described with reference to FIG. 6.

At 820, the memory system may determine, based on the determination of whether the second logical page size is different than the first logical page size, a second physical address that points to the starting location of the data within the second logical page. The operations of 820 may be performed according to the methods described herein. In some examples, aspects of the operations of 820 may be performed by a physical address component as described with reference to FIG. 6.

At 825, the memory system may read the data from the starting location of the data within the second logical page based on the second physical address. The operations of 825 may be performed according to the methods described herein. In some examples, aspects of the operations of 825 may be performed by a read component as described with reference to FIG. 6.

At 830, the memory system may transmit the data to a host device for the memory device. The operations of 830 may be performed according to the methods described herein. In some examples, aspects of the operations of 830 may be performed by a communication component as described with reference to FIG. 6.

In some examples, an apparatus as described herein may perform a method or methods, such as the method 800. The apparatus may include features, means, or instructions (e.g., a non-transitory computer-readable medium storing instructions executable by a processor) for receiving a read command associated with a first logical address that is associated with a starting location of data stored in a memory device, reading a first entry of a first L2P table based on the logical address, where the first entry includes a first physical address of a first logical page of the memory device having a first logical page size, and where a value of a first portion of the first physical address indicates a second logical page size of a second logical page of memory that contains the data, the first logical page including the second logical page, determining, based on the value of the first portion of the first physical address, whether the second logical page size is different than the first logical page size, determining, based on the determination of whether the second logical page size is different than the first logical page size, a second physical address that points to the starting location of the data within the second logical page, reading the data from the starting location of the data within the second logical page based on the second physical address, and transmitting the data to a host device for the memory device.

In some examples of the method 800 and the apparatus described herein, the second logical page size may be different than the first logical page size, and where determining the second physical address may include operations, features, means, or instructions for identifying a value of a second portion of the first physical address, where the value of the second portion of the first physical address points to a first entry of an L2P pointer table, reading, based on identifying the value of the second portion of the first physical address, a first entry of the L2P pointer table, the first entry of the L2P pointer table including a third physical address, adding an offset to the third physical address to determine a fourth physical address associated with a second entry in a second L2P table, where the offset may be indicated by a third portion of the first physical address, and reading the second entry of the second L2P table, where the second entry of the second L2P table includes at least a portion of the second physical address.

Some examples of the method 800 and the apparatus described herein may further include operations, features, means, or instructions for adding a second offset to the second entry of the second L2P table to generate the second physical address.

In some examples of the method 800 and the apparatus described herein, the second logical page size may be the same as the first logical page size, and determining the second physical address may include operations, features, means, or instructions for adding an offset to the first physical address to determine the second physical address.

Some examples of the method 800 and the apparatus described herein may further include operations, features, means, or instructions for reading a third entry of a main L2P table based on the logical address, where the third entry includes a third physical address that points to the first L2P table, and adding a third offset to the third physical address to generate a fourth physical address that points to the first entry of the first L2P table, where reading the first entry of the first L2P table includes reading the first entry of the first L2P table based on the fourth physical address.

In some examples of the method 800 and the apparatus described herein, reading the data from the starting location of the data within the second logical page may include operations, features, means, or instructions for reading a first portion of data from the second logical page, and reading a second portion of the data from a third logical page having the same logical page size as the second logical page.

It should be noted that the methods described herein describe possible implementations, and that the operations and the steps may be rearranged or otherwise modified and that other implementations are possible. Further, portions from two or more of the methods may be combined.

An apparatus is described. The apparatus may include a memory device and a controller for the memory device, the controller configured to cause the apparatus to receive a write command for writing a first amount of data to a memory device, the write command associated with a logical address, read, based on the logical address, a first entry of a first L2P table, where the first L2P table is for mapping a set of logical addresses to physical addresses of a corresponding first set of logical pages of the memory device that each have a first logical page size, and where the first entry of the first L2P table includes a first physical address of a first logical page of the first set of logical pages, identify, based on a size of the first amount of data, a second logical page size, write, based on the first physical address, at least a portion of the first amount of data to a second logical page of the memory device having the second logical page size, the first logical page including the second logical page, and store, based on identifying the second logical page size, a first entry of a second L2P table for mapping a second set of logical addresses to physical addresses of a corresponding second set of logical pages of the memory device, each logical page of the second set of logical pages having the second logical page size, where the first entry in the second L2P table includes a second physical address of the second logical page.

In some examples, the controller may be further configured to cause the apparatus to read, based on the logical address, a first entry of a main L2P table for mapping a set of logical addresses to a corresponding set of L2P tables including the first L2P table, the first entry of the main L2P table including a third physical address that points to the first L2P table, where reading the first entry of the first L2P table includes reading the first entry of the first L2P table based on the third physical address.

In some cases, the main L2P table may be stored in a first type of memory, and the first L2P table may be stored in a second type of memory.

In some instances, the controller may be further configured to cause the apparatus to store, based on identifying the second logical page size, a first entry in an L2P pointer table, the first entry in the L2P pointer table including a fourth physical address and a length of the second L2P table, where the fourth physical address points to the second L2P table.

In some examples, the controller may be further configured to cause the apparatus to receive a second write command for writing a second amount of data to the memory device, the second write command including a second logical address, read, based on the second logical address, a second entry of a third L2P table for mapping a third set of logical addresses to physical addresses of a corresponding third set of logical pages of the memory device that each may have the first logical page size, the second entry of the third L2P table including a fifth physical address of a third logical page of the third set of logical pages, identify, based on a second size of the second amount of data, a third logical page size, and write at least a portion of the second amount of data to a fourth logical page of the memory device having the third logical page size, where the third logical page includes the fourth logical page.

In some cases, the third logical page size is a different size than the second logical page size, and the controller may be further configured to cause the apparatus to store, based on identifying the third logical page size, a second entry in the L2P pointer table, the second entry in the L2P pointer table comprising a sixth physical address and a length of a fourth L2P table, where the sixth physical address points to the fourth L2P table associated with the fourth logical page.

In some examples, the third logical page size is the same size as the second logical page size, and the controller may be further configured to cause the apparatus to update the length of the second L2P table in the first entry of the L2P pointer table based on the third logical page size being the same size as the second logical page size In some cases, the first L2P table and the third L2P table may be the same L2P table.

In some instances, the first L2P table and the third L2P table may be different L2P tables.

In some examples, the controller may be further configured to cause the apparatus to determine that two or more logical pages having the second logical page size and pointed to by the second L2P table may have been deleted, and update, based on the determination that the two or more logical pages may have been deleted, the length of the second L2P table in the L2P pointer table and the length of the first L2P table in the first L2P pointer table.

In some cases, the controller may be further configured to cause the apparatus to receive a second write command for writing a second amount of data to the memory device, the second write command including a second logical address, read, based on the second logical address, a second entry of a third L2P table for mapping a third set of logical addresses to physical addresses of a corresponding third set of logical pages of the memory device that each may have the first logical page size, the second entry of the third L2P table including a fifth physical address of a third logical page of the third set of logical pages, identify that the second amount of data corresponds to the first logical page size, and write the second amount of data to the third logical page.

In some instances, the first logical page size is a maximum logical page size of a set of supported logical page sizes associated with the memory device, the set of supported logical page sizes including the second logical page size.

In some examples, the controller may be further configured to cause the apparatus to select the second logical page size from the set of supported logical page sizes.

An apparatus is described. The apparatus may include a memory device and a controller for the memory device, the controller configured to cause the apparatus to receive a read command associated with a first logical address that is associated with a starting location of data stored in a memory device, read a first entry of a first L2P table based on the logical address, where the first entry includes a first physical address of a first logical page of the memory device having a first logical page size, and where a value of a first portion of the first physical address indicates a second logical page size of a second logical page of memory that contains the data, the first logical page including the second logical page, determine, based on the value of the first portion of the first physical address, whether the second logical page size is different than the first logical page size, determine, based on the determination of whether the second logical page size is different than the first logical page size, a second physical address that points to the starting location of the data within the second logical page, read the data from the starting location of the data within the second logical page based on the second physical address, and transmit the data to a host device for the memory device.

In some examples, the second logical page size may be different than the first logical page size, and the controller may be further configured to cause the apparatus to identify a value of a second portion of the first physical address, where the value of the second portion of the first physical address points to a first entry of an L2P pointer table, read, based on identifying the value of the second portion of the first physical address, a first entry of the L2P pointer table, the first entry of the L2P pointer table including a third physical address, add an offset to the third physical address to determine a fourth physical address associated with a second entry in a second L2P table, where the offset may be indicated by a third portion of the first physical address, and read the second entry of the second L2P table, where the second entry of the second L2P table includes at least a portion of the second physical address.

In some cases, the controller may be further configured to cause the apparatus to add a second offset to the second entry of the second L2P table to generate the second physical address.

In some examples, the second logical page size may be the same as the first logical page size, and, to determine the second physical address, the controller may be further configured to cause the apparatus to add an offset to the first physical address to determine the second physical address.

In some cases, the controller may be further configured to cause the apparatus to read a third entry of a main L2P table based on the logical address, where the third entry includes a third physical address that points to the first L2P table, and add a third offset to the third physical address to generate a fourth physical address that points to the first entry of the first L2P table, where, to read the first entry of the first L2P table the controller may be further configured to cause the apparatus to read the first entry of the first L2P table based on the fourth physical address.

In some instances, the controller may be further configured to cause the apparatus to read a first portion of data from the second logical page, and read a second portion of the data from a third logical page having the same logical page size as the second logical page.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. Some drawings may illustrate signals as a single signal; however, it will be understood by a person of ordinary skill in the art that the signal may represent a bus of signals, where the bus may have a variety of bit widths.

The terms "electronic communication," "conductive contact," "connected," and "coupled" may refer to a relationship between components that supports the flow of signals between the components. Components are considered in electronic communication with (or in conductive contact with or connected with or coupled with) one another if there is any conductive path between the components that can, at any time, support the flow of signals between the components. At any given time, the conductive path between components that are in electronic communication with each other (or in conductive contact with or connected with or coupled with) may be an open circuit or a closed circuit based on the operation of the device that includes the connected components. The conductive path between connected components may be a direct conductive path between the components or the conductive path between connected components may be an indirect conductive path that may include intermediate components, such as switches, transistors, or other components. In some examples, the flow of signals between the connected components may be interrupted for a time, for example, using one or more intermediate components such as switches or transistors.

The term "coupling" refers to condition of moving from an open-circuit relationship between components in which signals are not presently capable of being communicated between the components over a conductive path to a closed-circuit relationship between components in which signals are capable of being communicated between components over the conductive path. When a component, such as a controller, couples other components together, the component initiates a change that allows signals to flow between the other components over a conductive path that previously did not permit signals to flow.

The term "isolated" refers to a relationship between components in which signals are not presently capable of flowing between the components. Components are isolated from each other if there is an open circuit between them. For example, two components separated by a switch that is positioned between the components are isolated from each other when the switch is open. When a controller isolates two components, the controller affects a change that prevents signals from flowing between the components using a conductive path that previously permitted signals to flow.

The devices discussed herein, including a memory array, may be formed on a semiconductor substrate, such as silicon, germanium, silicon-germanium alloy, gallium arsenide, gallium nitride, etc. In some examples, the substrate is a semiconductor wafer. In other examples, the substrate may be a silicon-on-insulator (SOI) substrate, such as silicon-on-glass (SOG) or silicon-on-sapphire (SOP), or epitaxial layers of semiconductor materials on another substrate. The conductivity of the substrate, or sub-regions of the substrate, may be controlled through doping using various chemical species including, but not limited to, phosphorous, boron, or arsenic. Doping may be performed during the initial formation or growth of the substrate, by ion-implantation, or by any other doping means.

A switching component or a transistor discussed herein may represent a field-effect transistor (FET) and comprise a three terminal device including a source, drain, and gate. The terminals may be connected to other electronic elements through conductive materials, e.g., metals. The source and drain may be conductive and may comprise a heavily-doped, e.g., degenerate, semiconductor region. The source and drain may be separated by a lightly-doped semiconductor region or channel. If the channel is n-type (i.e., majority carriers are electrons), then the FET may be referred to as a n-type FET. If the channel is p-type (i.e., majority carriers are holes), then the FET may be referred to as a p-type FET. The channel may be capped by an insulating gate oxide. The channel conductivity may be controlled by applying a voltage to the gate. For example, applying a positive voltage or negative voltage to an n-type FET or a p-type FET, respectively, may result in the channel becoming conductive. A transistor may be "on" or "activated" when a voltage greater than or equal to the transistor's threshold voltage is applied to the transistor gate. The transistor may be "off" or "deactivated" when a voltage less than the transistor's threshold voltage is applied to the transistor gate.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details to providing an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

For example, the various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. An apparatus comprising:

a memory device; and a controller for the memory device and configured to cause the apparatus to:

receive a write command for writing a first amount of data to the memory device, the write command associated with a logical address;

read, based at least in part on the logical address, a first entry of a first logical-to-physical (L2P) table, wherein the first L2P table is for mapping a plurality of logical addresses to physical addresses of a corresponding first plurality of logical pages that each have a first logical page size, and wherein the first entry of the first L2P table comprises a first physical address of a first logical page of the first plurality of logical pages;

identify, based at least in part on a size of the first amount of data, a second logical page size;

write, based at least in part on the first physical address, at least a portion of the first amount of data to a second logical page of the memory device having the second logical page size, the first logical page comprising the second logical page; and store, based at least in part on identifying the second logical page size, a first entry of a second L2P table for mapping a second plurality of logical addresses to physical addresses of a corresponding second plurality of logical pages of the memory device, each logical page of the second plurality of logical pages having the second logical page size, wherein the first entry in the second L2P table comprises a second physical address of the second logical page.

2. The apparatus of claim 1, wherein the controller is further configured to cause the apparatus to:

read, based at least in part on the logical address, a first entry of a main L2P table for mapping a plurality of logical addresses to a corresponding plurality of L2P tables comprising the first L2P table, the first entry of the main L2P table comprising a third physical address that points to the first L2P table; and wherein reading the first entry of the first L2P table comprises reading the first entry of the first L2P table based at least in part on the third physical address.

3. The apparatus of claim 2, wherein the main L2P table is stored in a first type of memory and the first L2P table is stored in a second type of memory.

4. The apparatus of claim 1, wherein the controller is further configured to cause the apparatus to:

store, based at least in part on identifying the second logical page size, a first entry in an L2P pointer table, the first entry in the L2P pointer table comprising a fourth physical address and a length of the second L2P table, wherein the fourth physical address points to the second L2P table.

5. The apparatus of claim 4, wherein the controller is further configured to cause the apparatus to:

receive a second write command for writing a second amount of data to the memory device, the second write command comprising a second logical address;

read, based at least in part on the second logical address, a second entry of a third L2P table for mapping a third plurality of logical addresses to physical addresses of a corresponding third plurality of logical pages of the memory device that each have the first logical page size, the second entry of the third L2P table comprising a fifth physical address of a third logical page of the third plurality of logical pages;

identify, based at least in part on a second size of the second amount of data, a third logical page size; and write at least a portion of the second amount of data to a fourth logical page of the memory device having the third logical page size, wherein the third logical page comprises the fourth logical page.

6. The apparatus of claim 5, wherein the third logical page size is a different size than the second logical page size, the controller further configured to cause the apparatus to:

store, based at least in part on identifying the third logical page size, a second entry in the L2P pointer table, the second entry in the L2P pointer table comprising a sixth physical address and a length of a fourth L2P table, wherein the sixth physical address points to the fourth L2P table associated with the fourth logical page.

7. The apparatus of claim 5, wherein the third logical page size is the same size as the second logical page size, the controller further configured to cause the apparatus to:

update the length of the second L2P table in the first entry of the L2P pointer table based at least in part on the third logical page size being the same size as the second logical page size.

8. The apparatus of claim 5, wherein the first L2P table and the third L2P table are the same L2P table.

9. The apparatus of claim 5, wherein the first L2P table and the third L2P table are different L2P tables.

10. The apparatus of claim 4, wherein the controller is further configured to cause the apparatus to:

determine that two or more logical pages having the second logical page size and pointed to by the second L2P table have been deleted; and update, based at least in part on the determination that the two or more logical pages have been deleted, the length of the second L2P table in the L2P pointer table and the length of the first L2P table in the first L2P pointer table.

11. The apparatus of claim 1, wherein the controller is further configured to cause the apparatus to:

receive a second write command for writing a second amount of data to the memory device, the second write command comprising a second logical address;

read, based at least in part on the second logical address, a second entry of a third L2P table for mapping a third plurality of logical addresses to physical addresses of a corresponding third plurality of logical pages of the memory device that each have the first logical page size, the second entry of the third L2P table comprising a fifth physical address of a third logical page of the third plurality of logical pages;

identify that the second amount of data corresponds to the first logical page size; and write the second amount of data to the third logical page.

12. The apparatus of claim 1, wherein the first logical page size is a maximum logical page size of a plurality of supported logical page sizes associated with the memory device, the plurality of supported logical page sizes comprising the second logical page size.

13. The apparatus of claim 12, wherein, to identify the second logical page size, the controller is configured to cause the apparatus to:

select the second logical page size from the plurality of supported logical page sizes.

14. An apparatus comprising:

a memory device; and a controller for the memory device and configured to cause the apparatus to:

receive a read command associated with a first logical address that is associated with a starting location of data stored in the memory device;

read a first entry of a first logical-to-physical (L2P) table based at least in part on the logical address, wherein the first entry comprises a first physical address of a first logical page of the memory device having a first logical page size, and wherein a value of a first portion of the first physical address indicates a second logical page size of a second logical page of memory that contains the data, the first logical page comprising the second logical page;

determine, based at least in part on the value of the first portion of the first physical address, whether the second logical page size is different than the first logical page size;

determine, based at least in part on the determination of whether the second logical page size is different than the first logical page size, a second physical address that points to the starting location of the data within the second logical page;

read the data from the starting location of the data within the second logical page based at least in part on the second physical address; and transmit the data to a host device for the memory device.

15. The apparatus of claim 14, wherein the second logical page size is different than the first logical page size, and wherein, to determine the second physical address, the controller configured to cause the apparatus to:

identify a value of a second portion of the first physical address, wherein the value of the second portion of the first physical address points to a first entry of an L2P pointer table;

read, based at least in part on identifying the value of the second portion of the first physical address, a first entry of the L2P pointer table, the first entry of the L2P pointer table comprising a third physical address;

add an offset to the third physical address to determine a fourth physical address associated with a second entry in a second L2P table, wherein the offset is indicated by a third portion of the first physical address; and read the second entry of the second L2P table, wherein the second entry of the second L2P table comprises at least a portion of the second physical address.

16. The apparatus of claim 15, wherein the controller is further configured to cause the apparatus to:

add a second offset to the second entry of the second L2P table to generate the second physical address.

17. The apparatus of claim 14, wherein the second logical page size is the same as the first logical page size, and wherein, to determine the second physical address, the controller is further configured to cause the apparatus to:

add an offset to the first physical address to determine the second physical address.

18. The apparatus of claim 14, wherein the controller is further configured to cause the apparatus to:

read a third entry of a main L2P table based at least in part on the logical address, wherein the third entry comprises a third physical address that points to the first L2P table; and add a third offset to the third physical address to generate a fourth physical address that points to the first entry of the first L2P table, wherein reading the first entry of the first L2P table are executable by the controller to cause the apparatus to read the first entry of the first L2P table based at least in part on the fourth physical address.

19. The apparatus of claim 14, wherein, to read the data from the starting location of the data within the second logical page, the controller is further configured to cause the apparatus to:

read a first portion of data from the second logical page; and read a second portion of the data from a third logical page having the same logical page size as the second logical page.

20. A non-transitory computer-readable medium storing code comprising instructions which, when executed by a processor of an electronic device, cause the electronic device to:

receive a write command for writing a first amount of data to a memory device, the write command associated with a logical address;

read, based at least in part on the logical address, a first entry of a first logical-to-physical (L2P) table, wherein the first L2P table is for mapping a plurality of logical addresses to physical addresses of a corresponding first plurality of logical pages of the memory device that each have a first logical page size, and wherein the first entry of the first L2P table comprises a first physical address of a first logical page of the first plurality of logical pages;

identify, based at least in part on a size of the first amount of data, a second logical page size;

write, based at least in part on the first physical address, at least a portion of the first amount of data to a second logical page of the memory device having the second logical page size, the first logical page comprising the second logical page; and store, based at least in part on identifying the second logical page size, a first entry of a second L2P table for mapping a second plurality of logical addresses to physical addresses of a corresponding second plurality of logical pages of the memory device, each logical page of the second plurality of logical pages having the second logical page size, wherein the first entry in the second L2P table comprises a second physical address of the second logical page.

21. The non-transitory computer-readable medium of claim 20, wherein the instructions, when executed by the processor of the electronic device, further cause the electronic device to:

read, based at least in part on the logical address, a first entry of a main L2P table for mapping a plurality of logical addresses to a corresponding plurality of L2P tables comprising the first L2P table, the first entry of the main L2P table comprising a third physical address that points to the first L2P table; and wherein reading the first entry of the first L2P table comprises reading the first entry of the first L2P table based at least in part on the third physical address.

22. The non-transitory computer-readable medium of claim 20, wherein the instructions are further executable by the processor to:

store, based at least in part on identifying the second logical page size, a first entry in an L2P pointer table, the first entry in the L2P pointer table comprising a fourth physical address and a length of the second L2P table, wherein the fourth physical address points to the second L2P table.

23. The non-transitory computer-readable medium of claim 22, wherein the instructions are further executable by the processor to:

receive a second write command for writing a second amount of data to the memory device, the second write command comprising a second logical address;

read, based at least in part on the second logical address, a second entry of a third L2P table for mapping a third plurality of logical addresses to physical addresses of a corresponding third plurality of logical pages of the memory device that each have the first logical page size, the second entry of the third L2P table comprising a fifth physical address of a third logical page of the third plurality of logical pages;

identify, based at least in part on a second size of the second amount of data, a third logical page size; and write at least a portion of the second amount of data to a fourth logical page of the memory device having the third logical page size, wherein the third logical page comprises the fourth logical page.

24. A non-transitory computer-readable medium storing code comprising instructions which, when executed by a processor of an electronic device, cause the electronic device to:

receive a read command associated with a first logical address that is associated with a starting location of data stored in a memory device;

read a first entry of a first logical-to-physical (L2P) table based at least in part on the logical address, wherein the first entry comprises a first physical address of a first logical page of the memory device having a first logical page size, and wherein a value of a first portion of the first physical address indicates a second logical page size of a second logical page of memory that contains the data, the first logical page comprising the second logical page;

determine, based at least in part on the value of the first portion of the first physical address, whether the second logical page size is different than the first logical page size;

determine, based at least in part on the determination of whether the second logical page size is different than the first logical page size, a second physical address that points to the starting location of the data within the second logical page;

read the data from the starting location of the data within the second logical page based at least in part on the second physical address; and transmit the data to a host device for the memory device.

25. The non-transitory computer-readable medium of claim 24, wherein the second logical page size is different than the first logical page size, wherein the instructions, when executed by the processor of the electronic device, further cause the electronic device to:

identify a value of a second portion of the first physical address, wherein the value of the second portion of the first physical address points to a first entry of an L2P pointer table;

read, based at least in part on identifying the value of the second portion of the first physical address, a first entry of the L2P pointer table, the first entry of the L2P pointer table comprising a third physical address;

add an offset to the third physical address to determine a fourth physical address associated with a second entry in a second L2P table, wherein the offset is indicated by a third portion of the first physical address; and read the second entry of the second L2P table, wherein the second entry of the second L2P table comprises at least a portion of the second physical address.

* * * * *